United States Patent
Konishi

(10) Patent No.: US 9,038,122 B2
(45) Date of Patent: *May 19, 2015

(54) DEVICE AND METHOD TO LIMIT OPERATIONS FROM AN AV DEVICE OR EXTERNAL TERMINAL

(75) Inventor: Kenji Konishi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 7 days.

This patent is subject to a terminal disclaimer.

(21) Appl. No.: 13/121,622

(22) PCT Filed: Sep. 30, 2009

(86) PCT No.: PCT/JP2009/067056
§ 371 (c)(1),
(2), (4) Date: May 31, 2011

(87) PCT Pub. No.: WO2010/038791
PCT Pub. Date: Apr. 8, 2010

(65) Prior Publication Data
US 2011/0239260 A1    Sep. 29, 2011

(30) Foreign Application Priority Data
Sep. 30, 2008  (JP) .................................. 2008-254530

(51) Int. Cl.
*H04N 7/173* (2011.01)
*H04N 21/443* (2011.01)
(Continued)

(52) U.S. Cl.
CPC .............. *H04N 21/443* (2013.01); *H04N 21/63* (2013.01); *H04L 12/66* (2013.01);
(Continued)

(58) Field of Classification Search
CPC ............ H04N 21/25; H04N 21/25816; H04N 21/25825; H04N 21/25875; H04N 21/482; H04N 21/4828; H04N 21/436; H04N 21/4532; H04N 21/633; H04N 21/6332; H04N 21/654; H04N 21/443; H04N 21/45; H04N 21/4227; H04N 21/63; H04N 21/485

USPC .......... 725/25, 37, 38, 105, 27–29, 114, 131, 725/132, 138, 139, 140, 148, 151, 152
See application file for complete search history.

(56) References Cited

U.S. PATENT DOCUMENTS 6,097,441 A  *  8/2000  Allport ......................... 348/552
6,584,493 B1     6/2003  Butler
(Continued)

FOREIGN PATENT DOCUMENTS

CN     1309867 A    8/2001
CN     2717117 Y    8/2005
(Continued)

OTHER PUBLICATIONS

European Search Report issued in corresponding EP Patent Application No. 09703145.4, dated Feb. 11, 2013.
(Continued)

*Primary Examiner* — Farzana Hossain
(74) *Attorney, Agent, or Firm* — Birch, Stewart, Kolasch & Birch, LLP

(57) ABSTRACT

Without using a gateway, an AV device is controlled as intended by an operator without causing a conflict between an operation by a user and an operation by the operator. An AV device operable via a network includes: an operation-instruction receiving section 112 for receiving an operation-instruction given via the network; an operation receiving section 111 for receiving an operation that is directly given not via the network; a limit determining section 113 for determining whether or not to limit each operation by distinguishing an operation based on an operation-instruction received by the operation-instruction receiving section 112 from an operation received by the operation receiving section 111; a receiver-side control section 115 for executing a control accompanying an operation when the limit determining section 113 determines not to limit the operation; and a basic display section 191 for generating display based on a basic function, wherein the AV device displays corresponding to an operation-instruction given via the network with superimposing the display on the display by the basic display section 191.

14 Claims, 23 Drawing Sheets

| OPERATION | USER-OPERATION VALID STATE | USER-OPERATION INVALID STATE |
|---|---|---|
| STATE OBTAINING | O | O |
| SETTING | × | O |
| POWER ON-OFF | × | O |
| VOLUME | × | O |
| CHANNEL | × | O |

| OPERATION | USER-OPERATION VALID STATE | USER-OPERATION INVALID STATE |
|---|---|---|
| MAIN-BODY POWER ON-OFF | O | O |
| MAIN-BODY VOLUME | O | O |
| MAIN-BODY CHANNEL | O | × |
| REMOTE CONTROL POWER | O | O |
| REMOTE CONTROL VOLUME | O | O |
| REMOTE CONTROL CHANNEL | O | × |
| REMOTE CONTROL Ch.1 | O | × |
| REMOTE CONTROL Ch.2 | O | × |
| REMOTE CONTROL Ch.3 | O | × |
| REMOTE CONTROL Ch.4 | O | × |
| ︵TE CONTROL | O | |

(51) Int. Cl.
  *H04L 12/66* (2006.01)
  *H04N 21/422* (2011.01)
  *H04N 21/4227* (2011.01)
  *H04N 21/433* (2011.01)
  *H04N 21/485* (2011.01)
  *H04N 21/6543* (2011.01)
  *H04N 21/63* (2011.01)

(52) U.S. Cl.
  CPC .. *H04N 21/42202* (2013.01); *H04N 21/42204* (2013.01); *H04N 21/4227* (2013.01); *H04N 21/4334* (2013.01); *H04N 21/485* (2013.01); *H04N 21/6543* (2013.01)

(56) References Cited

U.S. PATENT DOCUMENTS

| | | | |
|---|---|---|---|
| 7,237,029 | B2 | 6/2007 | Hino et al. |
| 7,913,278 | B2 | 3/2011 | Ellis et al. |
| 8,006,263 | B2 | 8/2011 | Ellis et al. |
| 8,046,801 | B2 | 10/2011 | Ellis et al. |
| 2002/0069276 | A1 | 6/2002 | Hino et al. |
| 2002/0129362 | A1* | 9/2002 | Chang et al. ............. 725/32 |
| 2004/0045031 | A1* | 3/2004 | Gautier ................. 725/110 |
| 2005/0028208 | A1* | 2/2005 | Ellis et al. ............... 725/58 |
| 2005/0039214 | A1 | 2/2005 | Lorenz et al. |
| 2005/0174494 | A1 | 8/2005 | Takenaka |
| 2005/0251827 | A1 | 11/2005 | Ellis et al. |
| 2006/0031883 | A1 | 2/2006 | Ellis et al. |
| 2006/0271997 | A1* | 11/2006 | Jacoby et al. .......... 725/135 |
| 2006/0290680 | A1 | 12/2006 | Tanaka et al. |
| 2008/0010655 | A1 | 1/2008 | Ellis et al. |
| 2008/0034038 | A1* | 2/2008 | Ciudad et al. .......... 709/204 |
| 2008/0166105 | A1 | 7/2008 | Vanderhoff |
| 2008/0189737 | A1 | 8/2008 | Ellis et al. |
| 2008/0189742 | A1 | 8/2008 | Ellis et al. |
| 2008/0189743 | A1 | 8/2008 | Ellis et al. |
| 2009/0044226 | A1 | 2/2009 | Ellis et al. |
| 2010/0251303 | A1 | 9/2010 | Ellis et al. |
| 2010/0299696 | A1* | 11/2010 | Konishi .................. 725/25 |
| 2011/0239260 | A1 | 9/2011 | Konishi |
| 2012/0036532 | A1 | 2/2012 | Ellis et al. |
| 2012/0036533 | A1 | 2/2012 | Ellis et al. |
| 2012/0060189 | A1 | 3/2012 | Ellis et al. |
| 2012/0066719 | A1 | 3/2012 | Ellis et al. |
| 2012/0079525 | A1 | 3/2012 | Ellis et al. |
| 2012/0266193 | A1 | 10/2012 | Ellis et al. |

FOREIGN PATENT DOCUMENTS

| | | |
|---|---|---|
| CN | 1764103 A | 4/2006 |
| CN | 1893529 | 1/2007 |
| EP | 2 239 938 A1 | 10/2010 |
| FR | 2845229 A1 | 4/2004 |
| JP | 2002-44765 A | 2/2002 |
| JP | 2002-92206 A | 3/2002 |
| JP | 2002-108184 A | 4/2002 |
| JP | 2004-96591 A | 3/2004 |
| JP | 2005-26856 A | 1/2005 |
| JP | 2005-197951 A | 7/2005 |
| JP | 2005-275670 A | 10/2005 |
| JP | 2006-157370 A | 6/2006 |
| JP | 2006-287639 A | 10/2006 |
| WO | WO 2009/093538 A1 | 7/2009 |

OTHER PUBLICATIONS

International Search Report for corresponding application PCT/JP2009/050635, dated Feb. 10, 2009.

U.S. Office Action for corresponding U.S. Appl. No. 12/864,452, dated Aug. 30, 2012.

U.S. Office Action for corresponding U.S. Appl. No. 12/864,452, dated Mar. 12, 2013.

Windows XP Worldwide, http://www.microsoft.com/china/windowsxp/pro/using/howto/gethelp/remoteassist/viaim.mspx, Aug. 28, 2002.

European Search Report issued in corresponding EP Application No. 09817823.9, dated Feb. 11, 2013.

U.S. Office Action for corresponding U.S. Appl. No. 12/864,452, dated Sep. 13, 2013.

U.S. Office Action for corresponding U.S. Appl. No. 12/864,452 dated Feb. 21, 2014.

Advisory Action issued for U.S. Appl. No. 12/864,452 on May 5, 2014.

* cited by examiner

| OPERATION | USER-OPERATION VALID STATE | USER-OPERATION INVALID STATE |
|---|---|---|
| STATE OBTAINING | ○ | ○ |
| SETTING | × | ○ |
| POWER ON-OFF | × | ○ |
| VOLUME | × | ○ |
| CHANNEL | × | ○ |

FIG. 3A

| OPERATION | USER-OPERATION VALID STATE | USER-OPERATION INVALID STATE |
|---|---|---|
| MAIN-BODY POWER ON-OFF | ○ | ○ |
| MAIN-BODY VOLUME | ○ | ○ |
| MAIN-BODY CHANNEL | ○ | × |
| REMOTE CONTROL POWER | ○ | ○ |
| REMOTE CONTROL VOLUME | ○ | ○ |
| REMOTE CONTROL CHANNEL | ○ | × |
| REMOTE CONTROL Ch.1 | ○ | × |
| REMOTE CONTROL Ch.2 | ○ | × |
| REMOTE CONTROL Ch.3 | ○ | × |
| REMOTE CONTROL Ch.4 | ○ | × |
| REMOTE CONTROL Ch.5 | ○ | |

FIG. 3B

DEVICE AND METHOD TO LIMIT OPERATIONS FROM AN AV DEVICE OR EXTERNAL TERMINAL

TECHNICAL FIELD

The present invention relates to an AV device, a server, an operation system for the AV device, and an operation program for the AV device that allow operation of the AV device via an external terminal.

BACKGROUND ART

In recent years, digital television broadcasting has started to enable watching a high resolution video image with an audio sound by a television receiver. Almost simultaneously, network-ready television receivers have been developed. Accompanying this, the functions of television receivers, further, devices for recording broadcast programs on a DVD, BD, or HDD and reproducing devices, which are called a set top box (STB), have been increasing. Yet further, One Seg broadcast receivers have been introduced to mobile phones to continuously promote increase in functions. As a result, operations and methods for various settings for these AV devices have become complicated, and inquiries to customer response centers arranged by manufactures and the like have increased.

In general, an operator, who has received an inquiry from a user, first asks the user to operate with a remote controller in order to recognize the state of the AV device of the user and the cause of a matter, and then tries to solve the problem by again asking the user to operating with the remote controller.

However, as has been described above, a method for operation has become complicated, a user often fails to operate as instructed by an operator, resulting in a problem that the user has an uncomfortable feeling or the trouble with the user cannot be solved instantly. In this situation, a method has been presented in which, using a device connected to a communication network, such as the Internet, the operator tries to solve the trouble through direct or indirect operation of the electric device of the user via the communication network from a terminal (refer to Patent Document 1).

However, this method possibly causes a conflict between remote operation and direct operation. When remote operation by an operator via a network and direct operation by a user are almost simultaneously performed, it is difficult to predict how the state of a device will be and to take measures. Upon occurrence of a conflict, a user who is consulting for solution of a trouble further becomes puzzled, which makes things even worse. To avoid this, a technology has been presented where, by preparing a dedicated gateway device in addition, even in a case of direct operation, an instruction is transferred to a target device once through the gateway, and then the target device is controlled (refer to Patent Document 2).

[Patent Document 1] Japanese Patent Application Laid-Open No. 2002-92206
[Patent Document 2] Japanese Patent Application Laid-Open No. 2002-44765

DISCLOSURE OF THE INVENTION

Problem to be solved by the Invention

However, in the technology described in Patent Document 2, it is necessary to arrange a gateway for the purpose of receiving support, which is impractical. Further, even in a case of direct operation, if the device of a user is controlled via the gateway, the operation takes time as a result, which is uncomfortable for the user.

The present invention has been developed in view of the above situation, and has an object to provide an AV device, a server, an operation system for the AV device, and an operation program for the AV device that enable, without using a gateway, an operator to control from outside as intended by the operator, without causing a conflict between an operation by a user and an operation by an operator.

Means for solving the Problems (1) In order to attain the above-described object, according to the present invention, an AV device operable via a network includes: an operation-instruction receiving section for receiving an operation-instruction given via the network; an operation receiving section for receiving an operation that is directly given not via the network; a limit determining section for determining whether or not to limit each operation by distinguishing an operation based on an operation-instruction received by the operation-instruction receiving section from an operation received by the operation receiving section; a receiver-side control section for executing a control accompanying an operation when the limit determining section determines not to limit the operation; and a basic display section for performing display based on a basic function, wherein the AV device performs display that corresponds to an operation-instruction given via the network, superimposing the display on the display by the basic display section.

In such a manner, an AV device according to the present invention determines whether or not to limit each operation by distinguishing an operation based on an operation-instruction received from outside from an operation directly received. Accordingly, control as intended by the operator can be performed without a conflict between a remote operation from outside by the operator and a direct operation by a user. As a result, the user can solve a trouble, using the remote operation with a support by the operator. On the other hand, because it is not necessary for an operation to be performed via a gateway or the like, direct operation by the user does not take time, and can be instantly performed. Incidentally, the AV device is an electronic device that enables simultaneous viewing and hearing of video and audio, for example, a television receiver, an STB, and a mobile terminal.

(2) The AV device according to the present invention further includes: a delegation-state managing section for managing whether or not an operation is delegated to outside, wherein, the delegation-state managing section makes the limit determining section determine whether or not to limit an operation received by the operation receiving section when an operation is delegated to outside, the delegation-state managing section does not make the limit determining section limit operations received by the operation receiving section when an operation is not delegated to outside. In such a manner, by managing limitation of direct operations from a user based on a delegation state, processing of a direct operation not in a delegation state can be simplified.

(3) In the AV device according to the present invention, the limit determining section determines whether or not to limit each operation, depending on a content of the each operation. Thus, for each operation, it is possible not only to determine whether or not an operation is via a network, but also to enable the operation or limit the operation, depending on the content of the operation. Accordingly, while limiting operations from a user in principle, it is also possible to enable only certain operations.

(4) Yet further, the AV device according to the present invention further includes: a limit-control-instruction receiving section for receiving a limit control instruction that instructs a control whether or not to limit each operation, wherein, according to the received limit control instruction, the limit-control-instruction receiving section decides a determination criterion for the limit determining section to determine whether or not to limit each operation. Thus, the AV device according to the present invention decides the determination criterion, according to a limit control instruction. Accordingly, it is possible to impose limitation of each operation or release the limitation, changing the determination criterion via a network.

(5) Further, the AV device according to the present invention further includes: a limit storage section for storage of a limit determination table that associates an operation based on the received operation-instruction or the received operation, with an operational limit, wherein the limit determining section determines whether or not to limit each operation, based on the stored limit determination table. Thus, the AV device according to the invention determines whether or not to limit each operation, based on the stored limit determination table. Accordingly, efficient determination is attained, and management of determination criterion is easy.

(6) Still further, the AV device according to the present invention further includes: a receiver-side display section for displaying a content of an operational limit, based on a determination criterion for the limit determining section to determine whether or not to limit each operation. Thus, a user can know the limit of an operation, and an operator can smoothly carry out support. Further, the user can know the current state of the AV device and receive support at ease.

(7) Yet further, the AV device according to the present invention further includes: a receiver-side image processing section for processing an image displayed by the basic display section and an image displayed by the receiver-side display section and creating shared image data as an image shared with outside; and a receiver-side image transmitting/receiving section for transmitting the shared image to the outside via a server. Thus, an operator who operates remotely from outside can easily recognize the state of an AV device as a target of operation, and communication with a user is easy.

(8) Further, in the AV device according to the present invention, the receiver-side display section displays the shared image data, superimposing the shared image data on the display by the basic display section. Thus, a user can view a transmission image and make delegation to remote operation at ease.

(9) Still further, in the AV device according to the present invention, when an operation that does not transmit the display by the basic display section has been made, the receiver-side image processing section creates the shared image data in which the display by the basic display section is not displayed. Thus, when a user does not want others to view a video image that the user views, the user can make the video image be in a state that prohibits an operator to view, protecting the privacy of the user.

(10) Yet further, the AV device according to the present invention is a television receiver. As the AV device is a television receiver, it is possible to display an operational limit on a received-image display screen.

(11) Still further, the AV device according to the present invention is an STB. Thus, it is possible to display an operational limit, superimposing the operational limit on a display, such as a menu screen, an electronic program listing, created by the STB itself.

(12) Yet further, the AV device according to the present invention is a mobile terminal. As the AV device is a mobile terminal, at a convenient place, a user can request an operation to outside.

(13) Further, according to the present invention, a server that enables operation of an AV device from an external terminal via a network includes: a connection establishing section for establishing a connection between the external terminal and the AV device when delegation information transmitted from the AV device for delegating an operation of the AV device from the external terminal is received; and an instruction processing section that receives an operation-instruction that is transmitted from the external terminal in order to operate the AV device, and transmits the operation-instruction to the AV device for which the connection with the external terminal is established.

Thus, upon receiving delegation information transmitted from the AV device, the server can establish a connection between the AV device and the external terminal, and transfer the operation-instruction to the AV device for which the connection is established. As a result, after a user has confirmed that the operation is limited, direct operation by the user is limited, and the user can receive support by an operator at ease.

(14) Still further, according to the present invention, an operation system for an AV device includes: a group of an AV device, a server, and an external terminal connected via a network, wherein the server includes: a connection establishing section for establishing a connection between the external terminal and the AV device upon receiving delegation information transmitted from the AV device for delegation of a operation of the AV device from the external terminal; and an instruction processing section that receives an operation-instruction that is transmitted from the external terminal in order to operate the AV device, and transmits the operation-instruction to the AV device for which the connection with the external terminal is established, wherein the AV device for receiving an operation-instruction given via the network; an operation receiving section for receiving an operation that is directly given not via the network; a limit determining section for determining whether or not to limit each operation by distinguishing an operation that is based on the received operation-instruction from the received operation; and a receiver-side control section for executing a control accompanying an operation when the limit determining section determines not to limit the operation.

Thus, in the operation system for an AV device according to the invention, the AV device determines whether or not to limit each operation by distinguishing an operation that is based on an operation-instruction received by an external terminal from an operation directly received. Accordingly, no conflict occurs between an operation performed from outside via a network and an operation directly performed on the AV device, and control can be performed as it is intended by an operator. As a result, a user can solve a trouble, using a remote operation with a support by an operator.

(15) Yet further, according to the present invention, an operation program for an AV device to be executed by the AV device that is operable via a network includes: operation-instruction receiving processing for receiving an operation-instruction given via the network; operation receiving processing for receiving an operation that is directly given not via the network; limit determining processing for determining whether or not to limit each operation by distinguishing an operation based on the received operation-instruction from the received operation; operation executing processing for executing a control accompanying an operation when the limit determining processing determines not to limit the operation.

Thus, the operation program, according to the present invention, for an AV device determines whether or not to limit each operation by distinguishing an operation that is based on an operation-instruction received by an external terminal from an operation directly received. Accordingly, no conflict occurs between an operation performed from outside via a network and an operation directly performed on the AV device, and control can be performed as it is intended by an operator. As a result, a user can solve a trouble, using a remote operation with a support by an operator.

Advantages of the Invention

According to the present invention, control as intended by the operator can be performed without a conflict between a remote operation from outside by the operator and a direct operation by a user. As a result, the user can solve a trouble, using the remote operation with a support by the operator. On the other hand, because it is not necessary for operation to be performed via a gateway or the like, direct operation by the user does not take time, and direct operation can be instantly performed.

BRIEF DESCRIPTION OF THE DRAWINGS

FIG. 3A is a conceptual diagram showing a limit determination table for association between remote operations and the limits of operations;

FIG. 3B is a conceptual diagram showing a limit determination table for association between direct operations and the limits of operations;

REFERENCE NUMERALS

Figure 1:
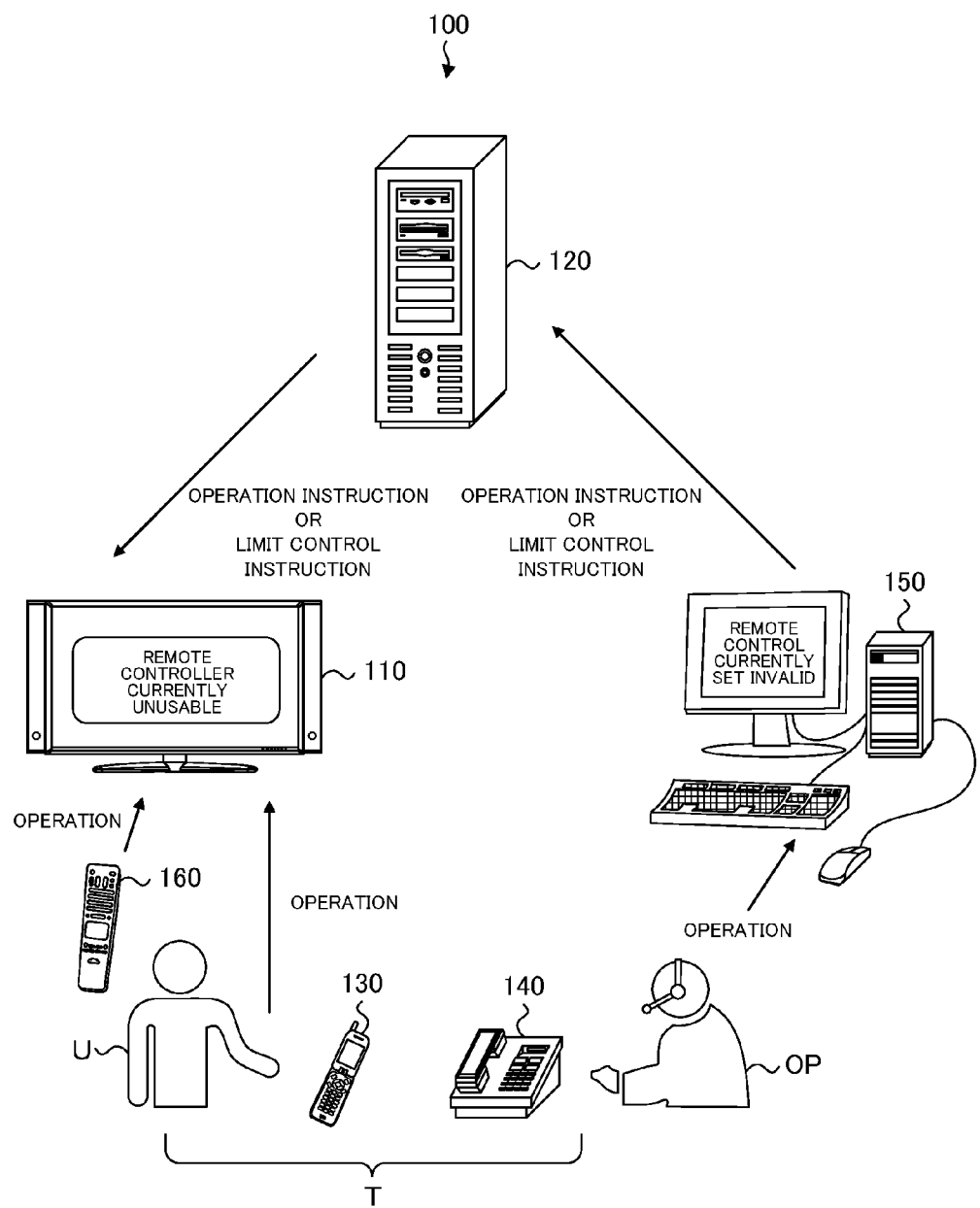
FIG. 1 is a conceptual diagram showing the configuration of an operation system for a television receiver according to the present invention.

100 Operation system for a television receiver (AV device)
110 Television receiver (AV device)
111 Operation receiving section
112 Operation-instruction receiving section
113 Limit determining section
114 Limit storage section
115 Receiver-side control section
116 Receiver-side delegation information transmitting section
117 Limit-control-instruction receiving section
118 Delegation state managing section
119 Receiver-side display section
120 Server
121 Connection establishing section
122 Temporary-connection-information storage section
123 Regular-connection-information storage section
124 Instruction processing section
126 Server-side control section
130 Phone
140 Phone
150 External terminal
151 Operation section
152 External-terminal-side display section
154 External-terminal-side transmitting/receiving section
155 External-terminal-side control section
160 Remote controller
161 Remote controller display section
190 Receiver basic function section
191 Basic display section
200 Operation system for a television receiver (AV device)
250 External terminal
256 External-terminal-side delegation information transmitting section
300 Operation system for a television receiver (AV device)
310 Television receiver (AV device)
320 Server
327 Server-side image processing section
328 Server-side image transmitting/receiving section
380 Receiver-side image processing section
381 Receiver-side image transmitting/receiving section
400 Operation system for an STB (AV device)
410 STB (AV device)

411 Display device (STB-side display section)
412 STB-side display section
412a Display section (STB-side display section)
412b Display section (STB-side display section)
412c Display section (STB-side display section)
415 STB-side control section
416 STB-side delegation information transmitting section
490 Basic function section
500 Operation system for a mobile phone (AV device)
510 Mobile phone (AV device)
511 Display screen
512 Mobile-phone-side display section
513 Sub-display
514 State indication lamp
515 Mobile-phone-side control section
516 Mobile-phone-side delegation information transmitting section
590 Mobile phone basic function section
M-1 Reception image
M-2 Basic information display
M-3 Button display
M-4 Operator-side remote controller display
M-5 Button
MC Mouse cursor
OP Operator
T-1 Image by television broadcast
T-2 Menu display
T-3 User operation invalidity display
T-4 Transmission image
T-5 Image transmission selecting button
T-6 Remote controller image
T Transfer means
TV digital
U User

BEST MODES FOR CARRYING OUT THE INVENTION

Embodiments according to the present invention will be described below, referring to the drawings. For easy understanding of the description, the same reference numerals will be assigned to the same elements in the respective drawings, and duplicated description will be omitted.

Embodiment 1

(Configuration of Operation System)

FIG. 1 is a conceptual diagram showing the configuration of an operation system 100 for a television receiver. The operation system 100 for a television receiver includes a television receiver 110 and a server 120. The television receiver 110, the server 120, and an external terminal 150 are connectable with each other via a network. The arrows shown in FIG. 1 represent transfer of main information in the present invention. Incidentally, also in the following drawings, regarding information, only main information will be shown, and other information will be omitted.

The television receiver 110 is connectable to the server 120 via the network, and is operable via the network. The television receiver 110 includes a tuner and receives television waves to enable viewing programs, and is connected to the network to function also as a terminal. The network is an ordinary network, regardless being wired or wireless. Further, the type of the television receiver 110 may be any one of large stationary types and portable types such as those mounted on a mobile terminal.

The operation system 100 of the television receiver is used, for example, when a user U cannot carry out setting at a start of using the television receiver 110 and the user contacts an operator OP by a phone 130. The operator OP is able to receive a call with a telephone 140 and the telephones 130 and 140 constitute transfer means T.

(Configuration of respective Parts)

Figure 2:
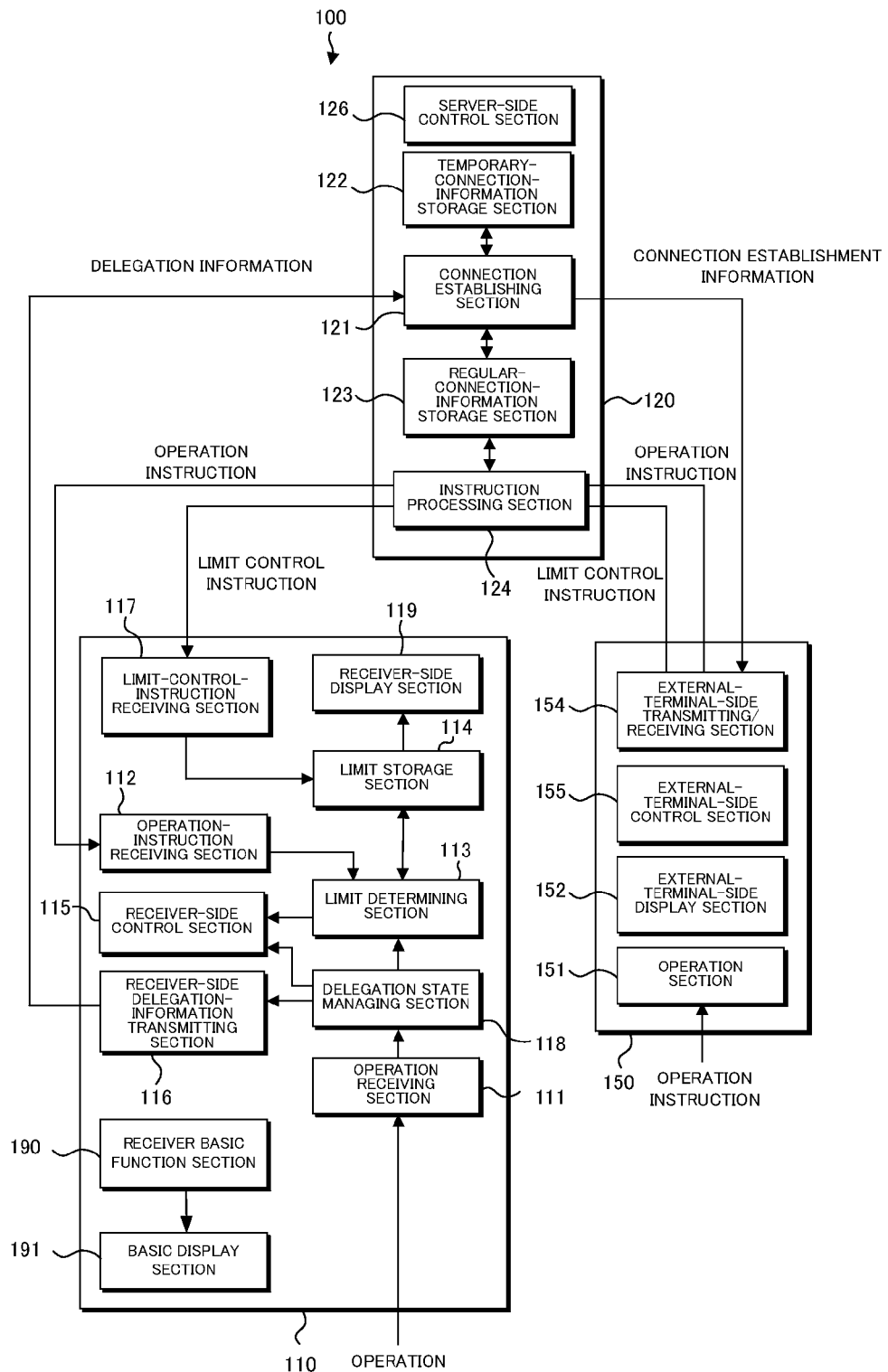
FIG. 2 is a block diagram showing the configurations of respective parts of the operation system for the television receiver according to the present invention.

FIG. 2 is a block diagram showing the configurations of respective parts of the operation system 100 for the television receiver. The television receiver 110 includes an operation receiving section 111, an operation-instruction receiving section 112, a limit determining section 113, a limit storage section 114, a receiver-side control section 115, a receiver-side delegation information transmitting section 116, a limit-control-instruction receiving section 117, a delegation state managing section 118, a receiver-side display section 119, a receiver basic function section 190, and a basic display section 191. Further, in order to control these respective sections, an operation program is executed in the television receiver 110.

The operation receiving section 111 performs operation-receiving processing for receiving an operation (direct operation) directly given from a user not via the network. The operation receiving section 111 is, for example, the operation buttons of main body of the television receiver 110 or a remote controller. The operation receiving section 111 receives operations, such as channel selection and setting of the Internet, and operation for delegation of an operation to the operator as well. The operation-instruction receiving section 112 performs operation-instruction receiving processing for receiving an operation-instruction (remote operation) given via the network, and transmits an operation-instruction to the limit determining section 113.

The limit determining section 113 performs limit determining processing for determining whether or not to limit each operation by distinguishing an operation based on a received operation-instruction from a received operation. Further, the limit determining section 113 determines whether or not to limit each operation, depending on the content of an operation and based on a limit determination table stored in the limit storage section 114. For example, regarding an operation based on an operation-instruction received from the external terminal 150, determination is made, for example, as to whether or not to limit an operation of obtaining information that represents the state of the television receiver 110, or an operation of changing the settings. Further, regarding a direct operation by the user, determination is individually made as to whether or not to limit an On-Off operation of the power supply, an operation of increasing/decreasing the audio volume, or an operation of selecting a channel. In such a manner, the limit determining section 113 serves as a filter of operations.

The limit storage section 114 stores limit determination tables for each association between an operation (remote operation) based on an operation-instruction received via the network or an operation (direct operation) directly received, and an operational limit. FIGS. 3A and 3B are respectively a conceptual diagram showing a limit determination table for each association between a remote operation and an operational limit, and a conceptual diagram showing a limit determination table for each association between a direct operation and an operational limit. Symbol ○ represents being not subjected to limiting and symbol x represents being subjected to limiting.

As shown in FIGS. 3A and 3B, in the user-operation valid state, a remote operation for obtaining information on the state of the television receiver 110 is not limited, however, remote operations, such as a setting change or power On-Off, are limited. A remote operation for obtaining a state is, for example, an operation of checking the current set values. Any direct operation is not limited. In such a manner, in the user-operation valid state, conflict between operations is avoided by limiting changes of settings or operations performed by the operator OP. On the other hand, in the user-operation invalid state that is set on the television receiver 110 when the user receives support, remote operation is not limited, however, a part of direct operations, such as designating or changing a channel, are limited. Non-limited direct operations are, for example, that for power supply by which the user U turns off the power when the user U feels uneasy or that for audio volume for preventing interruption of phone conversation. Incidentally, operations via the buttons fitted on the main body of the television receiver 110 that form the operation receiving section 111 and operations via the remote controller may be distinguished from each other to make a difference in limitation between them.

The receiver-side control section 115 performs control of the respective sections of the television receiver 110. When the limit determining section 113 determines not to limit an operation, the receiver-side control section 115 executes a control accompanying the operation. The receiver-side delegation information transmitting section 116 transmits delegation information managed by the delegation state managing section 118 to the server 120.

The limit-control-instruction receiving section 117 receives a limit control instruction that individually instructs whether or not to limit each operation. Further, the limit-control-instruction receiving section 117 decides a determination criterion for determination by the limit determining section 113 to determine whether or not to limit the individual operations. Upon receiving of a limit control instruction to instruct changing of the state, the limit-control-instruction receiving section 117 changes the state of operational limit of the television receiver 110 stored in the limit storage section 114. Further, upon receiving a limit control instruction to instruct a change of the table, the limit-control-instruction receiving section 117 changes the limit determination table stored in the limit storage section 114, according to the instruction. The limit storage section 114 stores the state of the television receiver 110. The states include, for example, the user-operation invalid state and the user-operation valid state.

The delegation state managing section 118 manages whether or not the user U is delegating operation to outside. When the operation receiving section 111 has received an operation from the user to delegate an operation to the operator, the delegation state managing section 118 changes the state of an operation of the television receiver 110 to the state of delegating the operation to outside. When the connection between the television receiver 110 and the external terminal 150 is cut off, the delegation state managing section 118 changes the operation to the state of non-delegating to outside. When operation is not delegated to outside, the delegation state managing section 118 transfers the content of an operation received by the operation receiving section 111 to the receiver-side control section 115. Accordingly, in this case, the limit determining section 113 does not limit operations received by the operation receiving section 111. On the other hand, when operation is delegated to outside, the delegation state managing section 118 transfers the content of an operation received by the operation receiving section 111 to the limit determining section 113. When operation is delegated to outside, the limit determining section 113 determines whether or not to limit the operation received by the operation receiving section.

The receiver-side display section 119 displays the contents of the individual operational limits, based on the determination criterion for individual determinations by the limit determining section 113 as to whether or not to limit the each operation. The receiver-side display section 119 can display the contents according to the information stored in the limit storage section 114. For example, display may be made as to whether or not the television receiver 110 is in the user-operation invalid state, and limited operations may be displayed as a result. Further, using not only characters but also icons, display contents can be intuitively understood.

As original functions of a television receiver, the receiver basic function section 190 has a function to receive television broadcasting signals, a function to decode the television broadcasting signals, and a function for a high image quality. The basic display section 191 displays a television broadcast that is output from the receiver basic function section 190, a video image that is input from an external device, a menu screen that the television receiver 110 itself creates, an electronic program list, a BML, a browser, or a current channel.

Figure 4A:
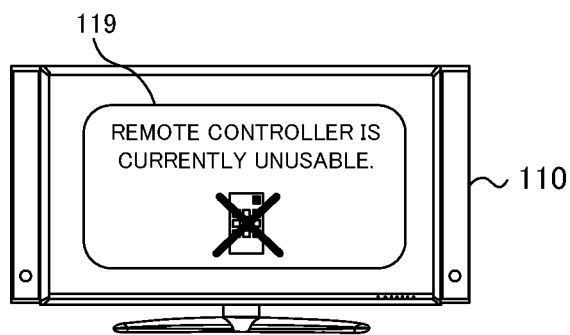
FIGS. 4A to 4D are diagrams showing an example of a display on the television receiver.
Figure 4B:
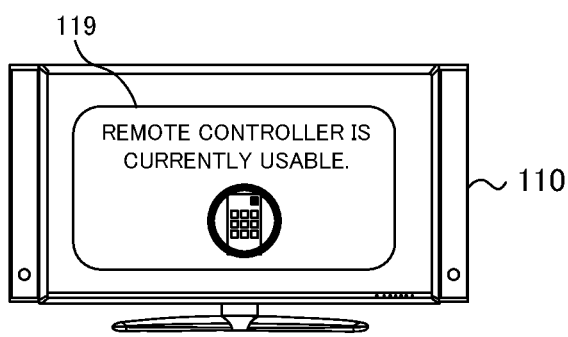

FIGS. 4A and 4B are diagrams showing an example of display on the television receiver 110. As shown in FIG. 4A, when the user-operation invalid state is set, the receiver-side display section 119 displays 'The remote controller cannot be currently used.', and informs the user of the state of operation-limited. Further, as shown in FIG. 4B, when the state is returned to the user-operation valid state, the receiver-side display section 119 displays 'The remote controller can be currently used.', and informs the user of the fact that the operation-limit has been released. In such a manner, the television receiver 110 capable of limiting operations is configured.

Figure 4C:
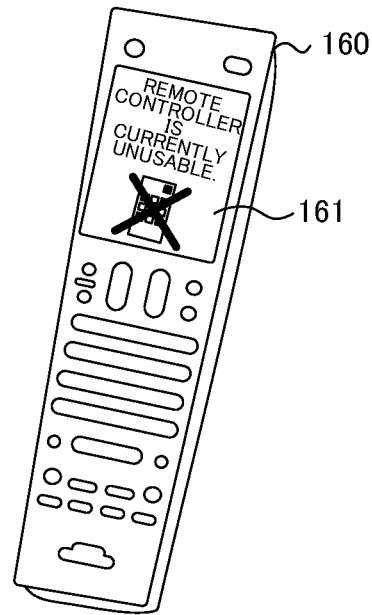
Figure 4D:
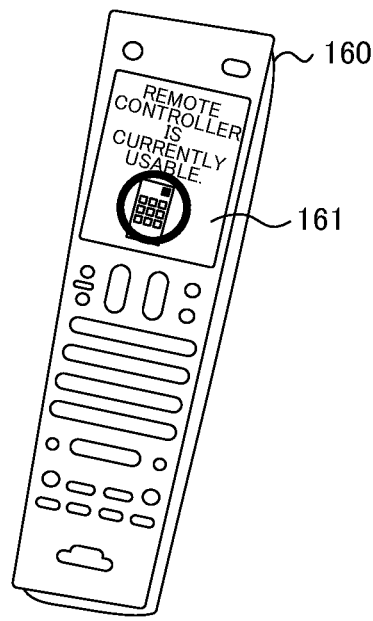

FIGS. 4C and 4D are diagrams showing an example of display on a remote controller 160 for controlling the television receiver 110. The remote controller 160 has a remote controller display section 161 mounted thereon. When the user-operation invalid state is set, the remote controller display section 161 displays 'The remote controller is currently unusable.', and informs the user of the operation-limited state. Further, as shown in FIG. 4D, when the state is returned to the user-operation valid state, the remote controller display section 161 displays 'The remote controller is currently usable.', and thereby informs the user of the fact that the operation-limit has been released. By displaying information on such states also on the remote controller 160, the user better understands the current state, which prevents the user from feeling uneasy or becoming confused by the fact that the remote controller 160 is currently unusable.

The server 120 includes a connection establishing section 121, a temporary-connection-information storage section 122, a regular-connection-information storage section 123, an instruction processing section 124, and a server-side control section 126. Upon receiving delegation information having been transmitted from the television receiver 110 for delegating an operation of the television receiver 110 from the external terminal 150, the connection establishing section 121 establishes a connection between the external terminal and the television receiver. The connection establishment is performed by registration of identification information on a pair of terminals which are temporarily connected, as a pair in an established connection.

When the television receiver 110 and the external terminal 150 are temporarily connected, the temporary-connection-information storage section 122 registers them in a temporary connection pair table, associating them with each other. Temporary connection is performed such that, for example, the user U transfers key information corresponding to the identification information of the television receiver 110, to the operator OP by transfer means T, and the server 120 checks the key information transmitted from the external terminal 150. The regular-connection-information storage section 123 stores a connection-established pair table in which pairs, for which connection has been established, are in association. That is, when a connection between the television receiver 110 and the external terminal 150 has been established, identification information on the both is stored in the connection-established pair table.

The instruction processing section 124 receives an operation instruction or a limit control instruction having been transmitted from the external terminal 150 to operate the television receiver 110, and transmits the instruction to the television receiver 110 for which a connection with the external terminal 150 has been established. The server-side control section 126 performs control of the respective sections of the server.

The external terminal 150 is a terminal operated by the operator OP. The external terminal 150 is a personal computer (PC) or the like, and can access the server 120 via the network. The external terminal 150 includes an operation section 151, an external-terminal-side display section 152, an external-terminal-side transmitting/receiving section 154, and an external-terminal-side control section 155.

The operation section 151 is an input device, for example, a keyboard, a mouse or the like, and receives operations by the operator OP. The operation section 151 receives inputs by the operator OP. The external-terminal-side display section 152 is, for example, a display screen, and displays information on connection establishment, information on the operation limit state of the television receiver 110, or the like. The external-terminal-side transmitting/receiving section 154 is an interface with the network, performs transmitting/receiving of information to/from outside, and is used also when the external terminal 150 accesses the television receiver 110. The external-terminal-side control section 155 performs control of the respective sections of the external terminal 150.

(Performance of Operation System)

Figure 5:
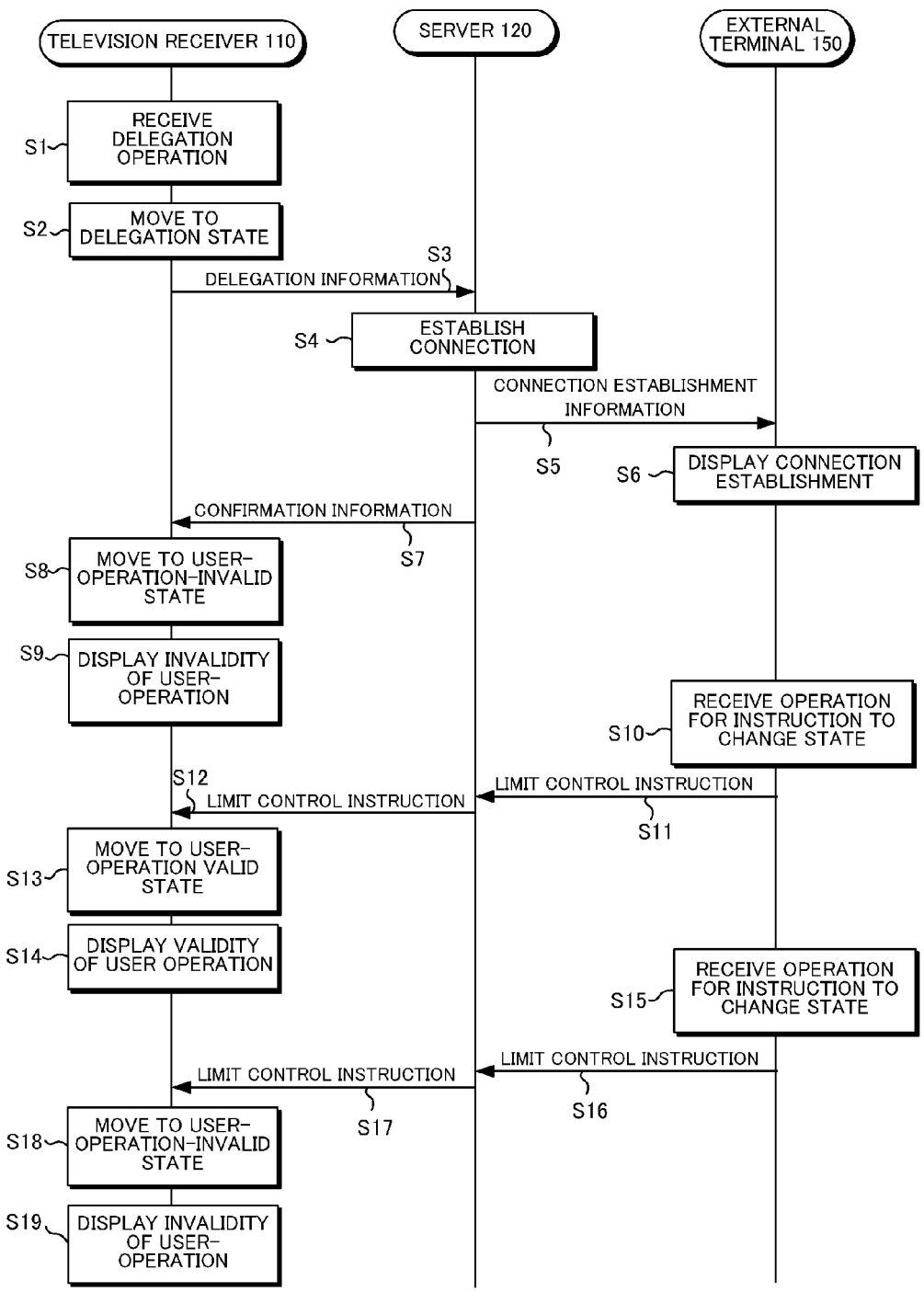
FIG. 5 is a sequence chart showing an example of a performance of the operation system for the television receiver according to the present invention.

The performance of the operation system for a television receiver arranged as described above will be described below. FIG. 5 is a sequence chart showing an example of the performance of the operation system 100 for the television receiver. For example, the following state will be assumed in the description. The user U has purchased the television receiver 110 and connected it with the Internet. However, the user U has not been successful in setting up the television receiver 110 and calls an operator OP by phone. The operator OP prompts the user U to receive network remote diagnosis of the television receiver 110 and provides the user U with a guidance of a method for temporary connection. When the television receiver 110 of the user U and the external terminal 150 of the operator OP are connected by an ordinary method, such as pre-registration or log-in, the server 120 stores identification information that identifies the pair into a temporary-connection pair table in the temporary-connection-information storage section 122. When a temporary connection has been established, the operator OP requests the user U for delegation of an operation of the television receiver 110, through display on the screen of the television receiver 110 or conversation. Herein, the user U receives explanation that the operation performed by himself/herself will be limited, for example, an explanation that a part or all of the buttons of the remote controller will become invalid. The explanation may be performed in a manner of asking the user U 'Will you delegate an operation of the TV to the operator? Yes or No?', or may be performed by including the delegation in a license agreement to be informed to the U prior to temporary connection or regular connection and then obtaining permission by the user U at a time.

First, the user U, who has accepted application of limit and desires device diagnosis, inputs delegation operation on the television receiver 110, and the television receiver 110 receives this operation (step S1). The television receiver 110 having received the delegation operation changes the state by the delegation state managing section 118 to the state 'currently in delegation', that is, the state of delegation of an operation to outside (step S2), and transmits the delegation information to the server 120 (step S3). The delegation information is information representing that the user U has delegated the operation to the operator OP.

The server 120 receives the delegation information and establishes regular connection (step S4). Then, the server 120 transmits connection establishment information to the external terminal 150 (step S5). Connection establishment information is information informing that regular connection has been established. The external terminal 150 receives the delegation establishment information transmitted from the server 120, and displays the fact that delegation has been made and connection establishment has been made on the external-terminal-side display section 152 (step S6). In this state, the server 120 transfers the instruction from the external terminal 150 to the television receiver 110 for which connection establishment has been made. Consequently, the operator OP performs operation of the television receiver 110 of the user who the operator OP is in charge of.

On the other hand, the server 120 also transmits the connection establishment information to the television receiver 110 (step S7). Upon receiving the connection establishment information, the television receiver 110 becomes into the user-operation invalid state (step S8). Concretely, as shown in FIGS. 3A and 3B, the limit determination criterion is changed; setting of the television receiver 110 by remote operation is made possible; and at the main body or via the remote controller, operations other than On-Off of the power and increasing/decreasing the audio volume are limited. Then, the television receiver 110 displays the fact that the television receiver 110 has become the user-operation invalid state (step S9). Thus, the operator OP becomes able to perform remote operation of the television receiver 110 from the external terminal 150, and perform setting or the like depending on the content of the inquiry from the user.

When certain settings are completed through operation by the operator OP, it becomes necessary for the operator OP to confirm whether the settings are made as desired by the user U. In this case, the operator OP informs the user U of the situation by phone and performs an operation to put the television receiver 110 into the user-operation valid state. The external terminal 150 receives the operation by the operator OP (step S10). Then, the external terminal 150 transmits a limit control instruction to instruct changing of the state (step S11), and the server 120 having received the limit control instruction transmits it to the television receiver 110 (step S12).

The television receiver 110 having received the limit control instruction becomes into the user-operation valid state (step S13). As a result of the change into the user-operation valid state, the television receiver 110 comes to receive operations such as channel designation from the user U. The television receiver 110 displays the fact that the television receiver 110 has been put into the user-operation valid state (step S14). As a result of the change of the television receiver 110 into such a state, the user U can confirm whether a response to an operation by the user U is as desired by the user U, and settings as desired by the user U have been made. In the user-operation valid state, regarding remote operation by the operator OP, remote operations to arrange setting of the television receiver 110 are limited.

Thereafter, if more remote operation of the television receiver 110 is necessary, the operator OP operates to arrange the television receiver 110 into the user-operation invalid state. The external terminal 150 receives an operation by the operator OP (step S15). Then, the external terminal 150 transmits a limit control instruction to instruct changing of the state (step S16). The server 120 having received the limit control instruction transmits it to the television receiver 110 (step S17).

The television receiver 110 having received the limit control instruction puts into the user-operation invalid state (step S18). As a result of the change of the television receiver 110 into the user-operation invalid state, the television receiver 110 limits operations, such as channel designation, from the user U. The television receiver 110 displays the fact that the television receiver 110 has become the user-operation invalid state (step S19). As a result of the change of the television receiver 110 into such a state, the operator OP is able to resume operation of the television receiver 110. In such a manner, the television receiver 110 is operated.

(Performance of Television Receiver)

Figure 6:
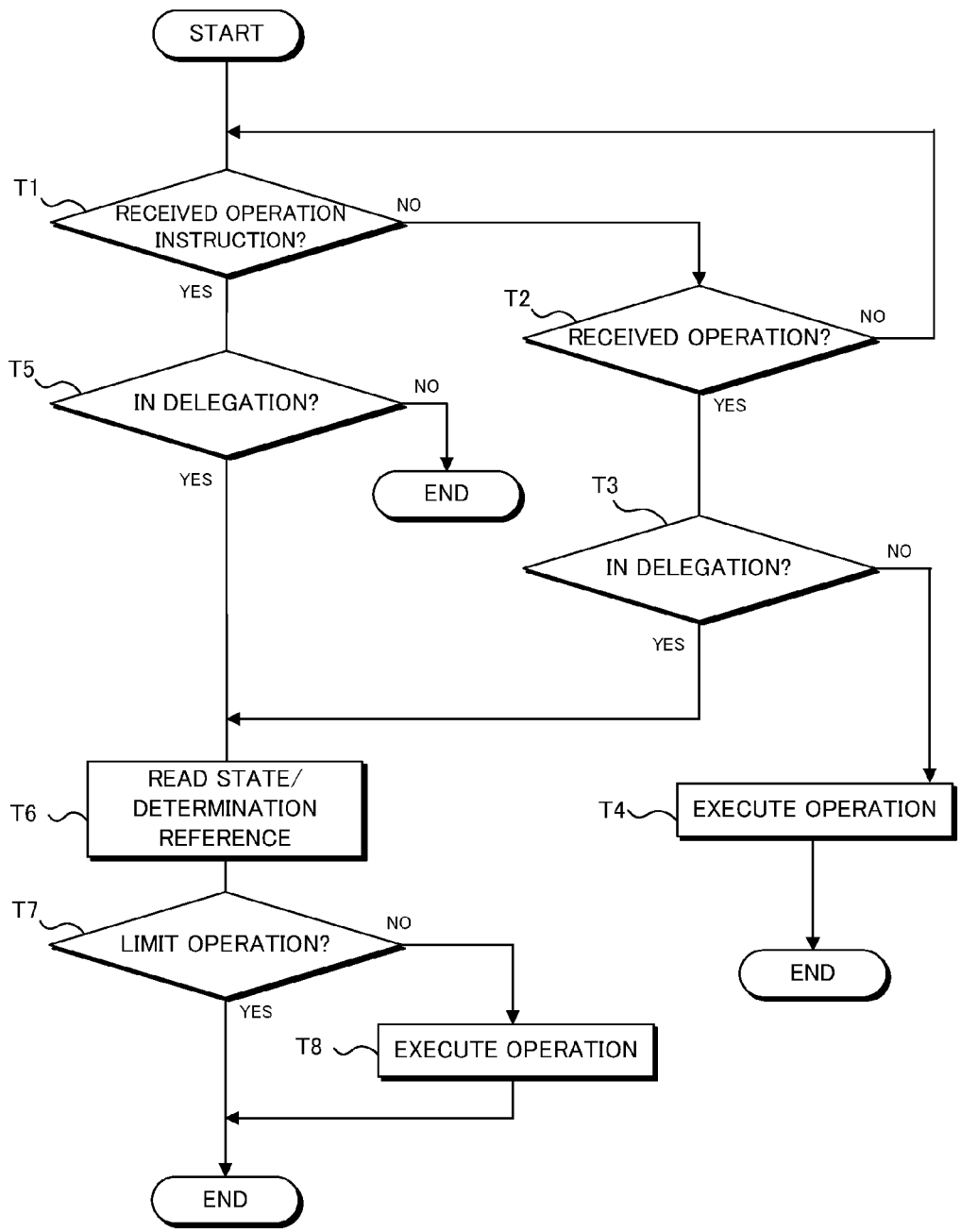
FIG. 6 is a flowchart showing a performance of the television receiver according to the present invention.

The performance of the television receiver 110 at the time the television receiver 110 is remotely or directly operated is described below. FIG. 6 is a flowchart showing the performance of the television receiver 110. First, the television receiver 110 determines whether or not it has received an operation instruction (step T1). If it is determined that it has not received an operation instruction, the television receiver 110 further determines whether or not it has received a direct operation (step T2). If it is determined that it has not received a direct operation, the process returns to step T1. If it is determined that it has received a direct operation, the television receiver 110 determines whether or not it is in the state of delegating operation to outside (step T3). If it is determined that the television receiver 110 is not in the state that operation is delegated to outside, the television receiver 110 executes the operation (step T4), and terminates the process. If it is determined that the television receiver 110 is in the state that operation is delegated to outside, the process proceeds to step T6. On the other hand, if it is determined that the television receiver 110 has received an operation instruction in step T1, it determines whether or not it is in the state that operation is delegated to outside (step T5). If it is determined that the television receiver 110 is not in the state that operation is delegated to outside, the television receiver 110 terminates the process as it is. If in the state of delegation, a determination reference and the current state are read (step T6).

Then, the television receiver 110 having read the determination criterion and the current state determines whether or not to limit the operation, based on the current state and the determination criterion (step T7). If the television receiver 110 has determined not to limit the operation, it executes a control accompanying the operation (step T8: operation execution processing). On the other hand, if the television receiver 110 has determined to limit the operation, it terminates the process as it is. In such a manner, the television receiver 110 determines whether or not to limit a remote operation or a direct operation, and performs accompanying it. The operation program for the television receiver 110 controls the respective sections in the television receiver 110.

Embodiment 2

Figure 7:
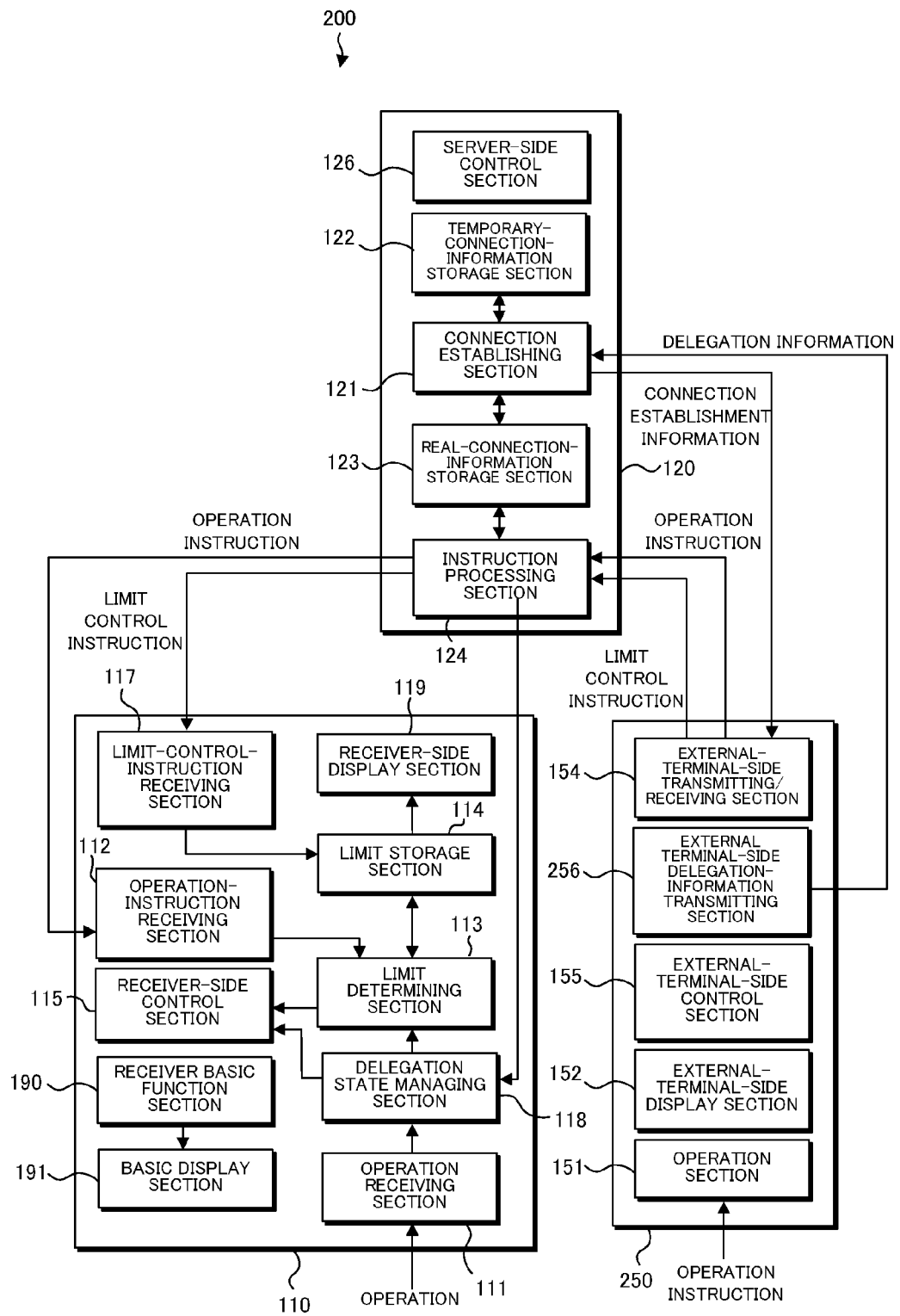
FIG. 7 is a block diagram showing the configurations of the respective parts of an operation system for a television receiver according to the present invention.

In the above-described embodiment, the television receiver 110 receives an operation for delegation and transmits the delegation information. However, an external terminal 250 can transmit delegation information to a television receiver 110 for an operation by the operator OP to be delegated operation of the television receiver 110 to outside. FIG. 7 is a block diagram showing the configurations of the respective parts of an operation system 200 for the television receiver 110. The external terminal 250 includes an external-terminal-side delegation information transmitting section 256. Upon input of a delegation operation via an operating section 151, the external-terminal-side delegation information transmitting section 256 transmits, to a server 120, delegation information that represents the fact that delegation has been made.

Figure 8:
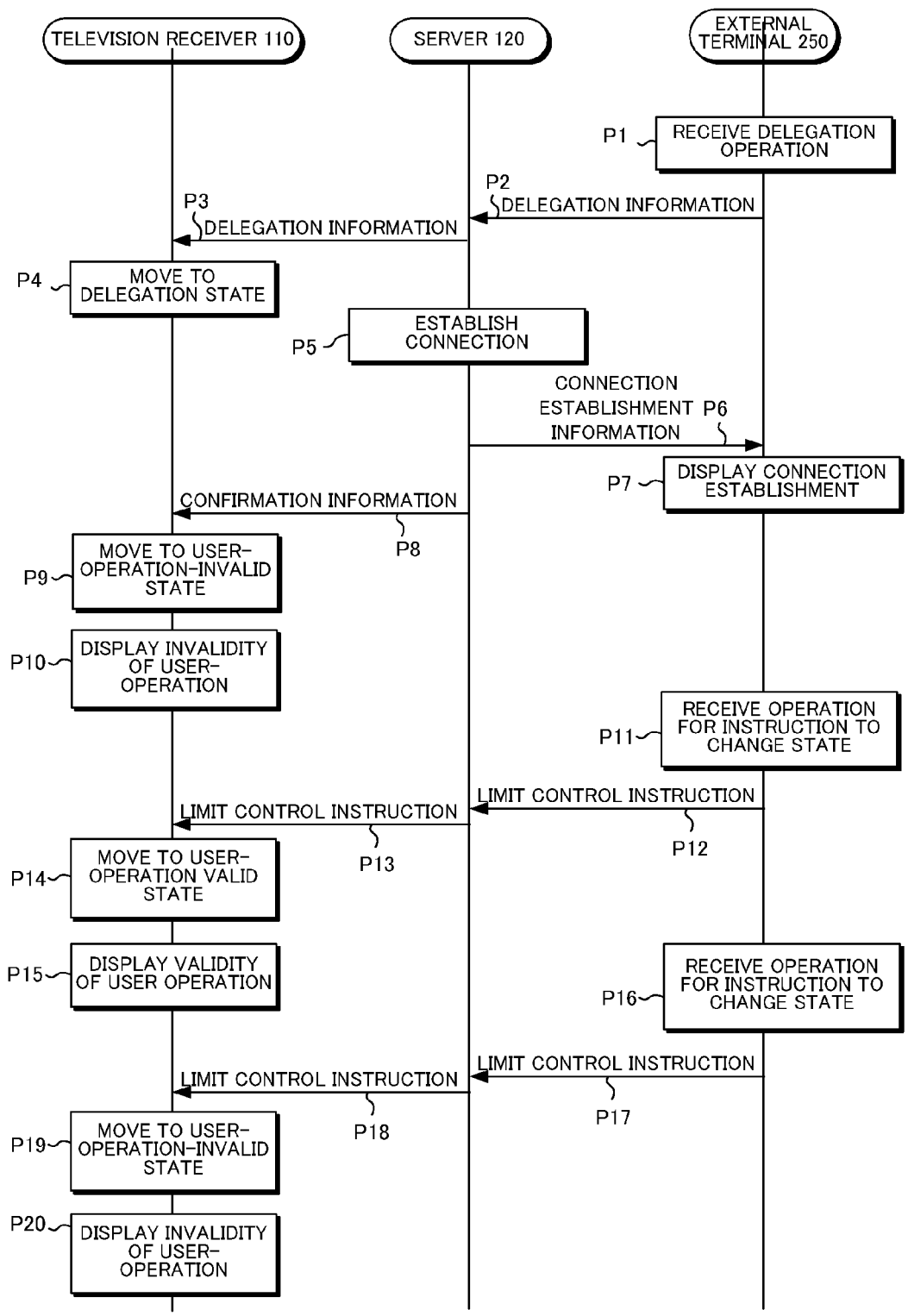
FIG. 8 is a sequence chart showing an example of a performance of the operation system for the television receiver according to the present invention.

The performance of the operation system 200 for a television receiver in Embodiment 2 is described below. FIG. 8 is a sequence chart showing an example of the performance of the operation system 200 for a television receiver. When a user U has expressed, using transfer means T, an intention to delegate operation to an operator OP, the operator OP inputs the fact, that a delegation has been made, to the operating section 151 of the external terminal 250 (step P1). The external-terminal-side delegation information transmitting section 256 transmits delegation information that represents the fact that a delegation has been made, to the server 120 (step P2), and the server 120 transmits the delegation information to a delegation state managing section 118 of the television receiver 110 (step P3).

The television receiver 110 having received the delegation information changes the content of management to the state of delegating operation to outside (in delegation) (step S4). On the other hand, the server establishes a connection (step P5). The server 120 transmits connection establishment information to the external terminal 250 (step P6), and the external terminal 250 displays the fact that a connection has been established (step P7). The performance thereafter, namely the performance of P8 to P20 shown in FIG. 8 is similar to that of S7 to S19 shown in FIG. 5. In such a manner, the external terminal 250 may transmit delegation information to the television receiver 110, based on an operation by the operator OP, so that the operation of the television receiver 110 is delegated to outside.

Incidentally, in the above-described embodiment, the television receiver 110 includes the delegation state managing section 118, however, the television receiver 110 does not need to include the delegation state managing section 118. In such a case without the delegation state managing section 118, upon a direct operation, a limit determining section 113 determines operational limit, including determination of the delegation state.

Embodiment 3

Figure 9A:
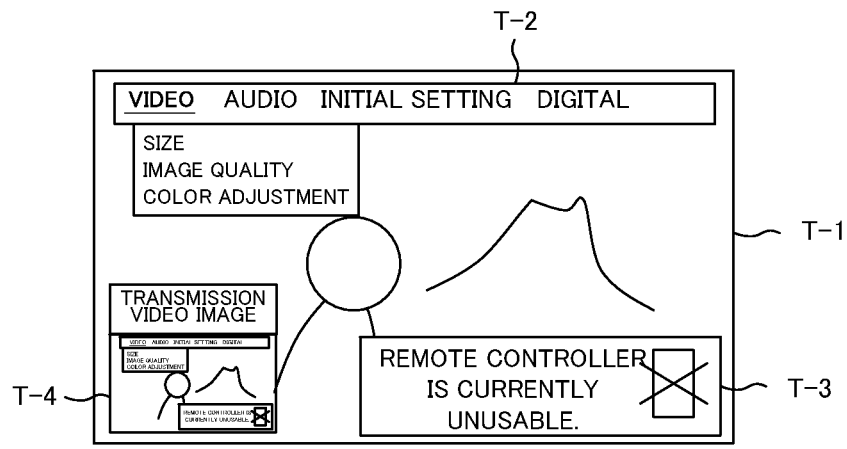
FIGS. 9A and 9B are diagrams showing an example of a display on the television receiver.
Figure 9B:
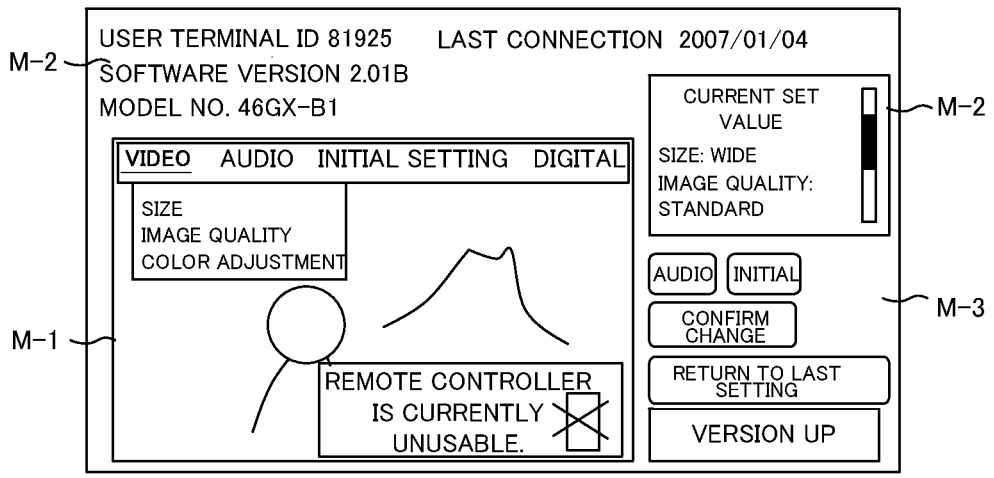
Figure 10A:
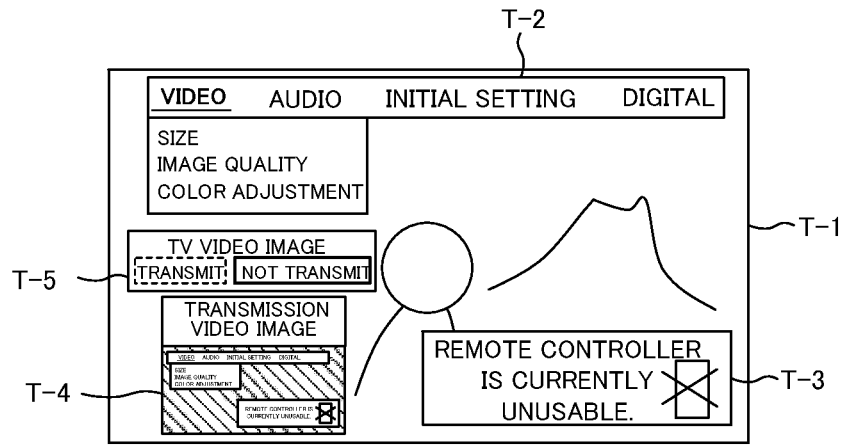
FIGS. 10A and 10B are diagrams showing an example of a display on the television receiver.
Figure 10B:
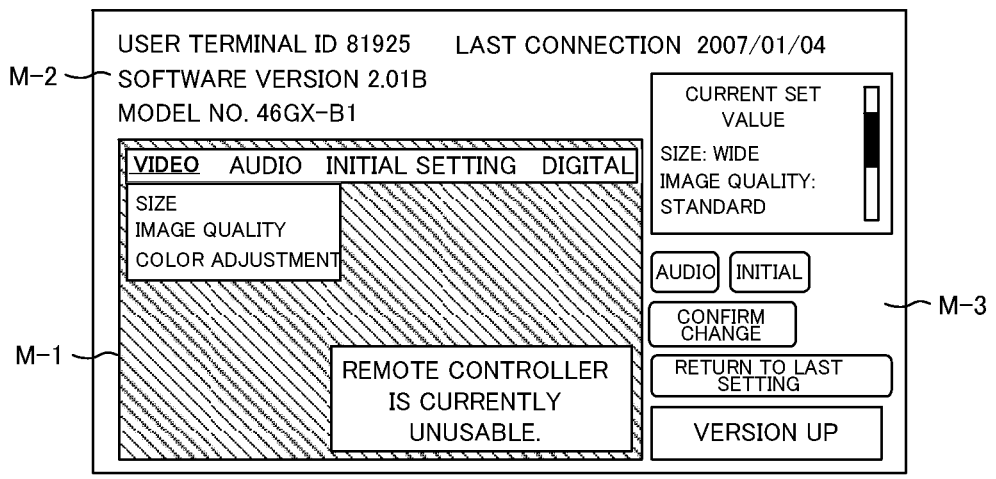
Figure 11A:
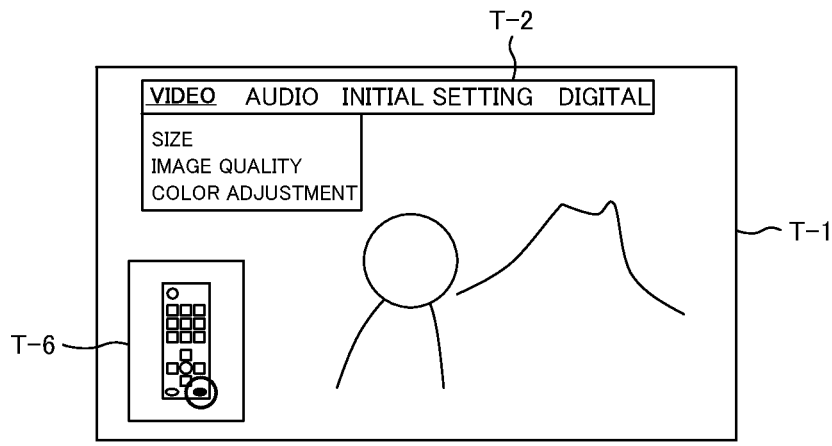
FIGS. 11A and 11B are diagrams showing an example of a display on the television receiver.
Figure 11B:
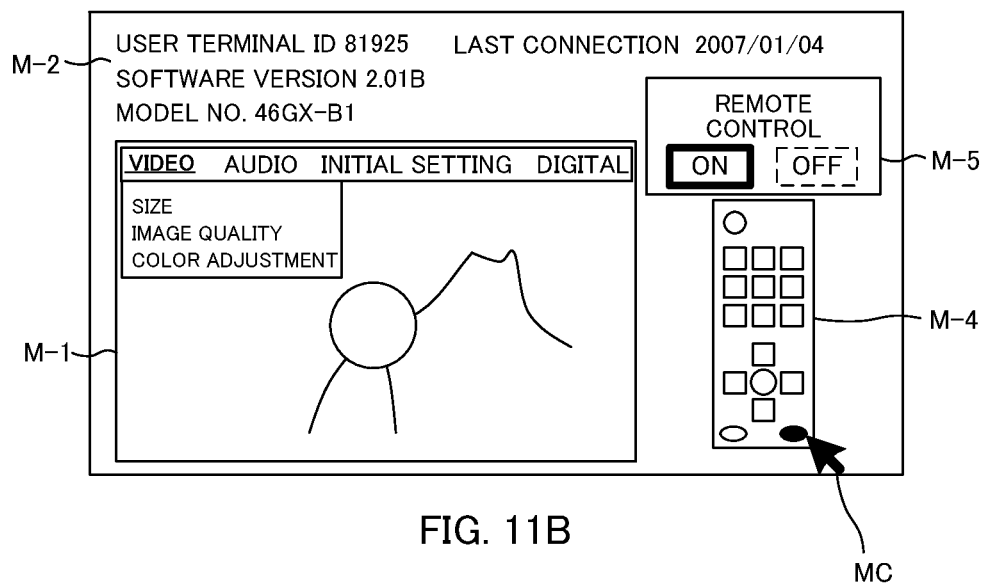

As described below, respective screen displays on a television receiver 110 and an external terminal 150 during explanation of a usage method to a user U carried out through actual remote operation by an operator OP. FIGS. 9A to 11B show various examples. FIGS. 9A, 10A, and 11A are examples of displays on the television receiver 110 during remote operation by the operator OP. FIGS. 9B, 10B, and 11B are examples of displays on the external terminal 150 corresponding to FIGS. 9A, 10A, and 10B.

In FIG. 9A, the television receiver 110 is receiving a television broadcast, displaying an image T-1 of the broadcast, and outputting an audio sound. Further, the television receiver 110 is displaying a menu display T-2 for settings of the television receiver 110 at the upper portion of the screen, and displaying a user operation invalidity display T-3 showing the fact that control by the user is invalid, superimposing the display T-3 on the image T-1 of the television broadcast. Further, because the user U feels uneasy about which image the operator OP is viewing, a transmission image T-4 to be transmitted to the external terminal 150 via the server 120 is preferably displayed simultaneously. For this display, a receiver-side display section 119 can display the transmission image T-4, superimposing it on the image T-1 of the television broadcast. Further, not only the image transmitted from the television receiver 110, but also the below described image displayed on the external terminal 150 may be returned as shared image data and displayed on the receiver-side display section 119.

As shown in FIG. 9A, when the television receiver 110 is made into the user-operation invalid state, the receiver-side display section 119 superimposes a display that means 'The remote controller is currently unusable.' on a video image by a basic display section 191, and thereby informs the user of the state of operational limit.

FIG. 9B shows an example of a display image on the external terminal 150, wherein the display image is formed using a transmission image transmitted from the television receiver 110. Herein, a reception image M-1 from the connected television receiver 110, a display M-2 of the state of the television receiver 110 and basic information on the setting values, and a display M-3 of buttons for changing settings are displayed. Upon the inquiry from the user U, the operator OP can view this screen to confirm the display contents on the television receiver 110, based on the reception image M-1. Further, viewing the basic information display M-2 makes it easier for the operator OP to identify the cause of the inquiry from the user U so that the operator OP can appropriately respond to the inquiry. Further, when a solution of the trouble is required, it is possible to refer to the display M-3 of buttons that are necessary for remotely changing the settings of the television receiver 110, and use the display M-3 to change the settings. In the above-described example, only the image on the television receiver 110 is displayed on the external terminal 150, and however, audio may be output from the speaker of the external terminal 150 to explain same as the image.

An example in consideration of the privacy of the user U will be described below. FIGS. 10A and 10B show an example of a display on the television receiver 110 and an example of a display on the external terminal 150. It is possible that the user U does not want others to view an image that the user U is viewing at the time of an inquiry. For such a case, a function can be given to the television receiver 110 to enable the user U to select whether or not to transmit an image that is displayed on the television receiver 110.

FIG. 10A shows a display in which the transmission image T-4 of the television receiver 110 and image transmission selection buttons T-5 which enable the user U to select by himself/herself are superimposed on the image T-1 of the television broadcast on the screen.

FIG. 10B shows an image of a display on the external terminal 150. When the user U selects 'not transmit' a TV video image with an image transmission selection button T-5, the viewed image is not transmitted, and a content that does not affect the privacy, such as the menu display T-2 or the user-operation invalidity display T-3, is displayed. As a result, the external terminal 150 displays the reception image M-1. Likewise, the transmission image T-4, which is displayed on the television receiver 110, also covers the viewed image. The display that covers the viewed image is, for example, a monocolored solid image, but not limited thereto. That is, the transmission image T-4 viewed by the user U and the reception image M-1 viewed by the operator OP have the same content, which makes the user U feel easy. In such a manner, when an operation has been made that does not transmit a display displayed on the basic display section 191, a receiver-side image processing section 380 creates shared image data that does not include the display displayed on the basic display section 191.

FIGS. 11A and 11B display examples of displays of a guidance how to use by remote operation. A display of the guidance how to use is effective in case that a trouble with the user U is related to an operation method. FIG. 11A shows an example of a display of the guidance how to use. In addition to the image T-1 of the television broadcast and the menu display T-2, a remote controller image T-6, which displays which operation corresponding to which button of the remote controller has been made from the external terminal 150, is displayed, superimposed on the image T-1 of the television broadcast.

FIG. 11B shows an example of a display on the external terminal side in case that a display of the guidance how to use has been made. In addition to the reception image M-1 and the basic information display M-2, displayed are the operator-side remote controller display M-4 for the operator OP to operate the television receiver 110 and the buttons M-5 for setting whether or not to perform remote operation. The external terminal 250 displays a mouse cursor MC.

Figure 12:
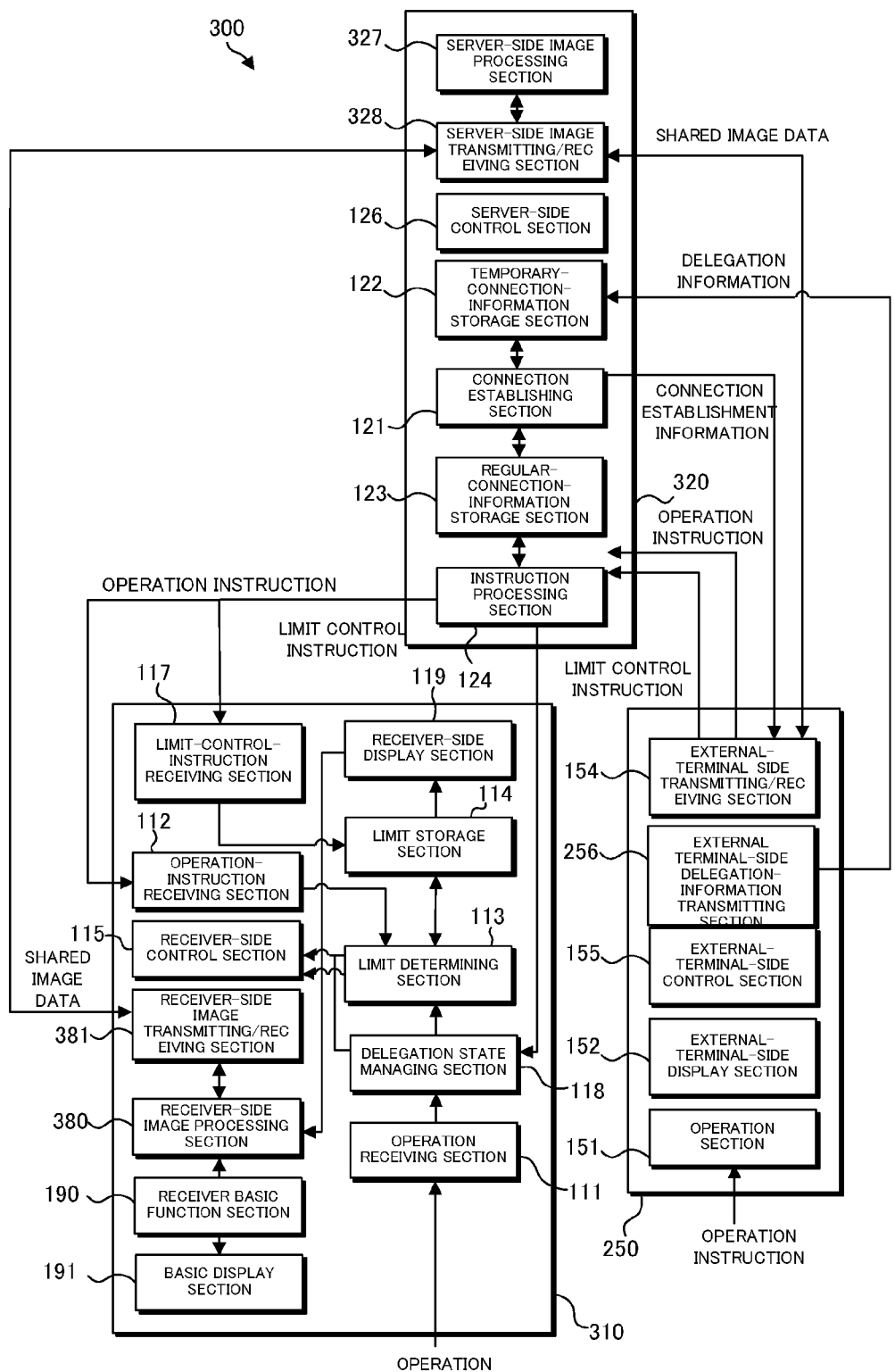
FIG. 12 is a block diagram showing the configurations of the respective parts of an operation system for a television receiver according to the present invention.

FIGS. 12A and 12B are block diagrams showing the configurations of the respective parts of an operation system 300 for a television receiver that realizes the above-described system. Differently from the cases of the operation systems 100 and the 200 for a television receiver, a television receiver 310 includes the receiver-side image processing section 380 and a receiver-side image transmitting/receiving section 381, and a server 320 includes a server-side image processing section 327 and a server-side image transmitting/receiving section 328.

The receiver-side image processing section 380 executes conversion of resolutions, data compression, coding, and the like of display images on the receiver basic function section 190 and the receiver-side display section 119, and creates a transmission image to the server. The methods of the compression and the coding are not particularly limited, and however, methods that complete processing at a high speed are preferable. An image created here (shared image data) is to be displayed as a transmission image T-4, and transmitted to the server 320 via the receiver-side image transmitting/receiving section 381.

The server 320 receives the image by the server-side image transmitting/receiving section 328. Then, the server 320 executes decoding, data decompression, conversion of the resolution, and the like by the server-side image processing section 327 to create an image to be displayed on the external terminal 250. Data created here is transmitted from the server-side image transmitting/receiving section 328 to the external terminal 250, and finally displayed as a reception image M-1 on the external terminal 250. Herein, in order not to disturb smooth conversation between the user U and the operator OP, it is important to make the time lag as short as possible. Concretely, it is preferable for the system to be designed such that the time from the occurrence of a change in the image on the television receiver 310 on the user U side to the reflection of the change to a reception image M-1 on the operator OP side.

Figure 13:
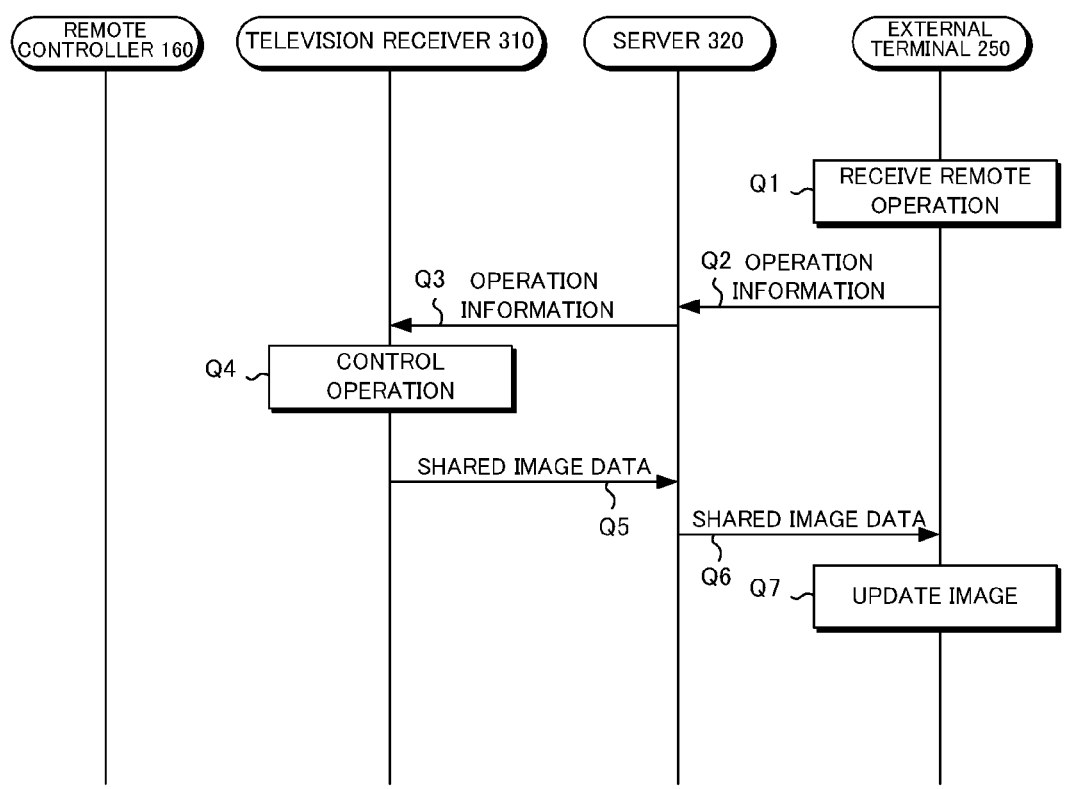
FIG. 13 is a sequence chart showing an example of a performance of the operation system for the television receiver according to the present invention.

FIG. 13 is a sequence chart showing the performance of the operation system 300 for a television receiver during remote operation from the external terminal 250. When the operator OP has clicked a button on the operator-side remote controller display M-4 by moving the mouse cursor MC on the external terminal 250, the external terminal 250 receives a remote operation (step Q1). Operation information corresponding to the button reaches via the server 320 (step Q2) to the television receiver 310 (step Q3). The television receiver 310 interprets the operation information and controls properly (step Q4). Herein, if there is a change in the display image on the television receiver 310, the receiver-side image processing section 380 creates a transmission image (shared image data) to the server, and transmits the transmission image via the receiver-side image transmitting/receiving section 381 to the server 320 (step Q5). The server 320 receives the image by the server-side image transmitting/receiving section 328, and creates a screen to be displayed on the external terminal 250. The server 320 transmits the created data from the server-side image transmitting/receiving section 328 to the external terminal (step Q6), and the external terminal 250 displays the data as a reception image M-1 (step Q7).

Figure 14:
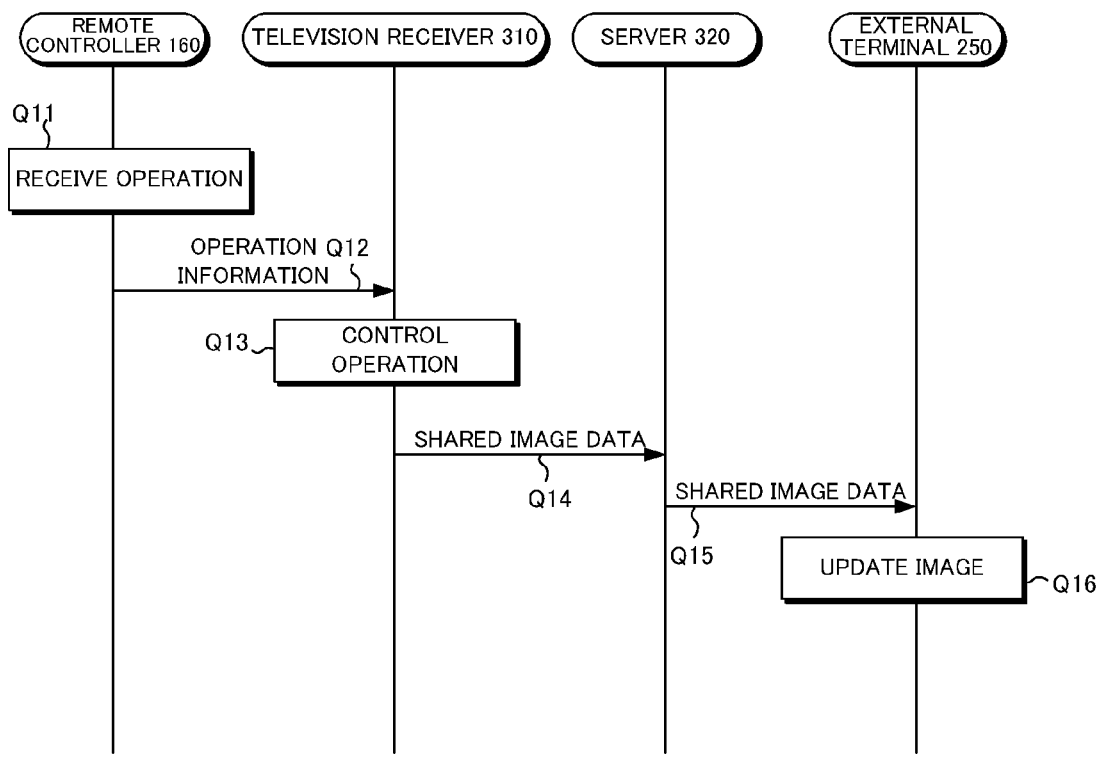
FIG. 14 is a sequence chart showing an example of a performance of the operation system for the television receiver according to the present invention.

FIG. 14 is a sequence chart showing the operation of updating the image on the external terminal 250 during operation of the television receiver 310. The remote controller 160 receives an operation of the user U (step Q11). The television receiver 310 receives operation information corresponding to the operation (step Q12). Then, the television receiver 310 executes control, based on the operation (step Q13), and updates the image to be displayed, as necessary. The operation up to here is the same as normal operation of the television receiver 310 by the remote controller 160. Subsequently, the receiver-side image processing section 380 creates a transmission image (shared image data) to the server, and transmits the image via the receiver-side image transmitting/receiving section 381 to the server 320 (step Q14). The server 320 receives the image by the server-side image transmitting/receiving section 328, and creates image data to be displayed on the external terminal 250. The server-side image transmitting/receiving section 328 transmits the created image data to the external terminal 250 (step Q15), and the image data is finally displayed as a reception image M-1 on the external terminal 250 (step Q16).

In the explanation of FIGS. 13 and 14, arrangement is made such as to transmit image data in case that there is a change by an operation in the image to be displayed. This aims at reducing the loads of television receiver 310, the server 320, and the network line, and however, image data may be periodically transmitted without being limited thereto.

Embodiment 4

Figure 15:
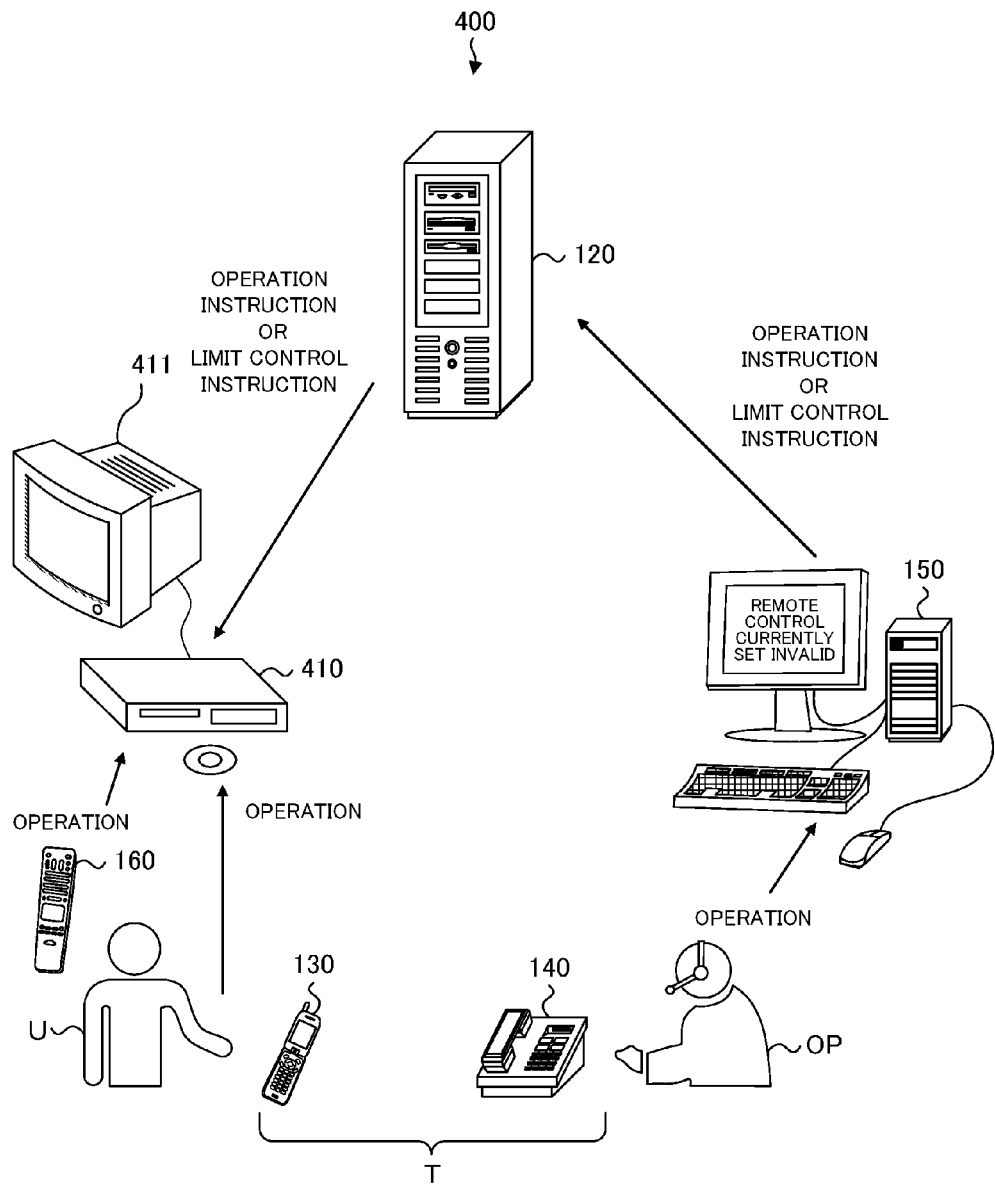
FIG. 15 is a conceptual diagram showing the configuration of an operation system for an STB according to the present invention.

An embodiment of the invention by a set top box (hereinafter, referred to as an STB), such as a reproducing device or a recording device of a DVD or BD, a game device, or the like that outputs video images and audio sounds by connecting signals to a television receiver or the like, will be described below. FIG. 15 is a conceptual diagram showing the configuration of an operating system 400 for a television receiver. The operation system 400 for an STB includes an STB 410 and a server 120. The STB 410, the server 120, and an external terminal 150 are connectable via a network. Further, the STB 410 is connected with a display device 411, such as a television receiver or a projector, with an ordinary video signal cable, such as a component, a composite, a D-terminal, or HDMI cable. The STB 410 displays a created video image on the display device 411. The STB 410 may be an integrated type that has a display device 411 arranged on itself. The arrow shown in FIG. 15 represents transfer of main information according to the present invention. Incidentally, also in the figures below, regarding transfer of information, only main information will be represented, and other information will be omitted.

The STB 410 is connectable to the server 120 via a network, and operable via the network. The STB 410 does not necessarily need to include a tuner, and enables any one of viewing and hearing of video images and audio sounds stored in a DVD, BD, or HDD and playing a game, and also functions as a terminal connected with the network. Further, unlike a PC, the STB 410 does not necessarily need to have a keyboard, a mouse, or the like, and is operated mainly with a remote controller 160, a game controller, or the like. Further, an embodiment of the STB 410 may be a stationary type or a portable type such as a mobile AV terminal or a mobile game machine on assumption that it is connected with the display device 411 and the like. The network is an ordinary network regardless of being wired or wireless.

Figure 16:
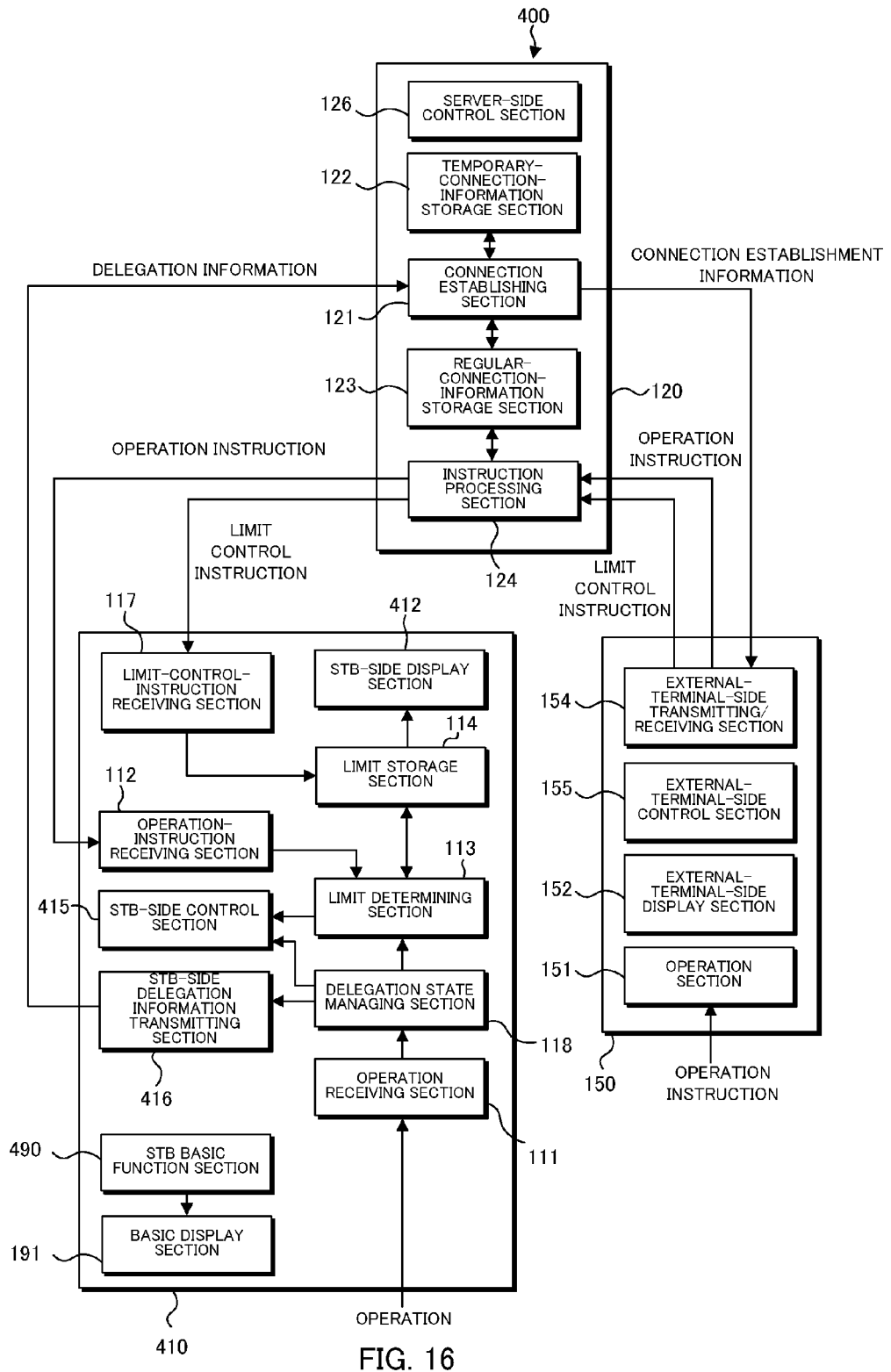
FIG. 16 is a block diagram showing the configurations of the respective parts of the operation system for the STB according to the present invention.

FIG. 16 is a block diagram showing the configurations of the respective parts of an operation system 400 for an STB. FIG. 17 is a diagram showing an example of a display representing whether or not remote controller is usable for the STB 410. An STB-side control section 415 and an STB-side delegation information transmitting section 416 are respectively corresponding to a receiver-side control section 115 and a receiver-side delegation information transmitting section 116. The STB-side control section 415 controls the respective sections of the STB 410. When a limit determining section 113 has determined that an operation is not limited, the STB-side control section 415 executes a control accompanying the operation. The STB-side delegation information transmitting section 416 transmits delegation information managed by the delegation state managing section 118 to the server 120. Further, an STB basic function section 490 has a video image reproduction function and the like as original functions of an STB. The basic display section 191 displays a video image, which is an output from the STB basic function section 490, a menu screen, which the STB 410 itself creates, an electronic program list, a BML, a browser, a reproduction position, the current channel, or the like. In such a manner, most of the system is configured similarly to that in Embodiment 1.

Figure 17A:
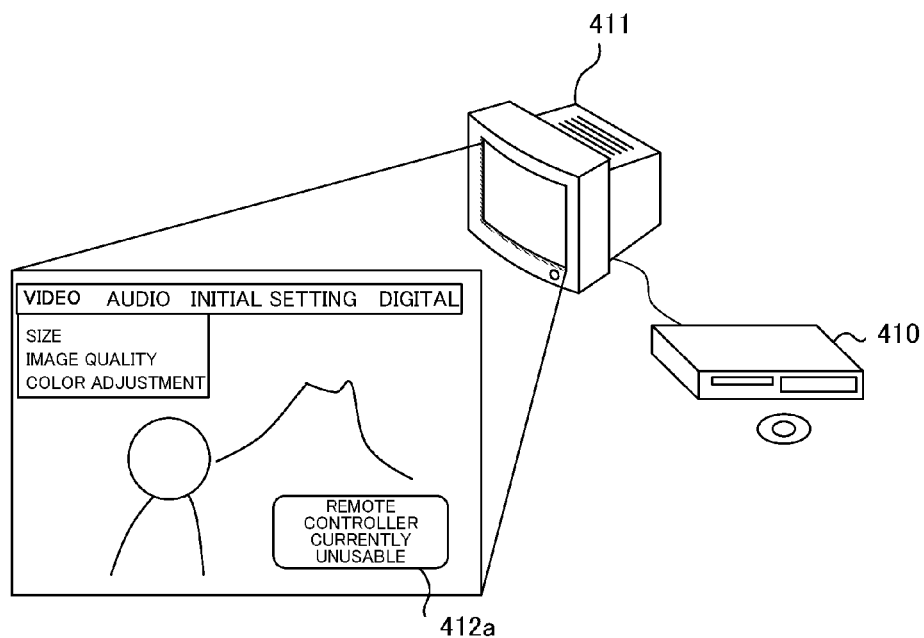
FIGS. 17A to 17C are diagrams showing an example of a display on the STB.
Figure 17B:
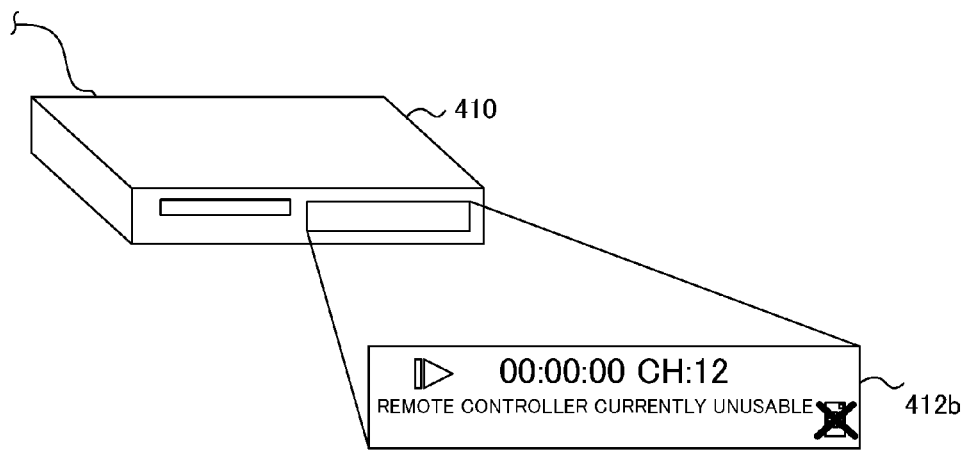
Figure 17C:
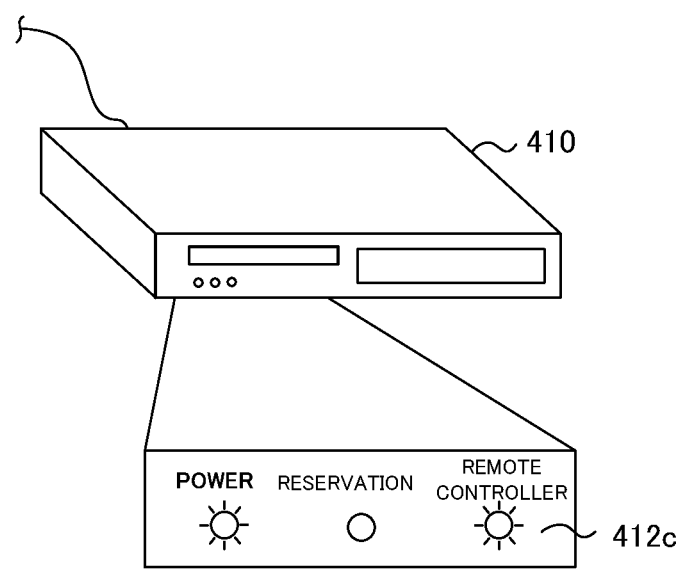

However, as the STB does not have a large display section, when the user operation invalid state is set, the STB-side display section 412 superimposes a message 'The remote controller is currently unusable.' on an image that the STB originally displays. FIG. 17A shows an example of a display in the operation system 400 for an STB. Thus, a message can be displayed by the STB display device 411. The STB display device 411 is fitted to the main body of the STB 410, and displays information mainly with characters and icons. In such a manner, the STB informs the user of the state of the operational limit. Further, as shown in FIG. 17B, information may be displayed on a display section 412b (STB-side display section) of the STB display device 411. Still further, as shown in FIG. 17C, an LED 412c (STB-side display section) may be fitted on the main body of the STB 410 to indicate the valid or invalid state of user operation by the lighting state thereof or a color of lighting. The performances of the server 120 and the external terminal 150 are similar to those in Embodiments 1 and 2, and description will be omitted.

Embodiment 5

Figure 18:
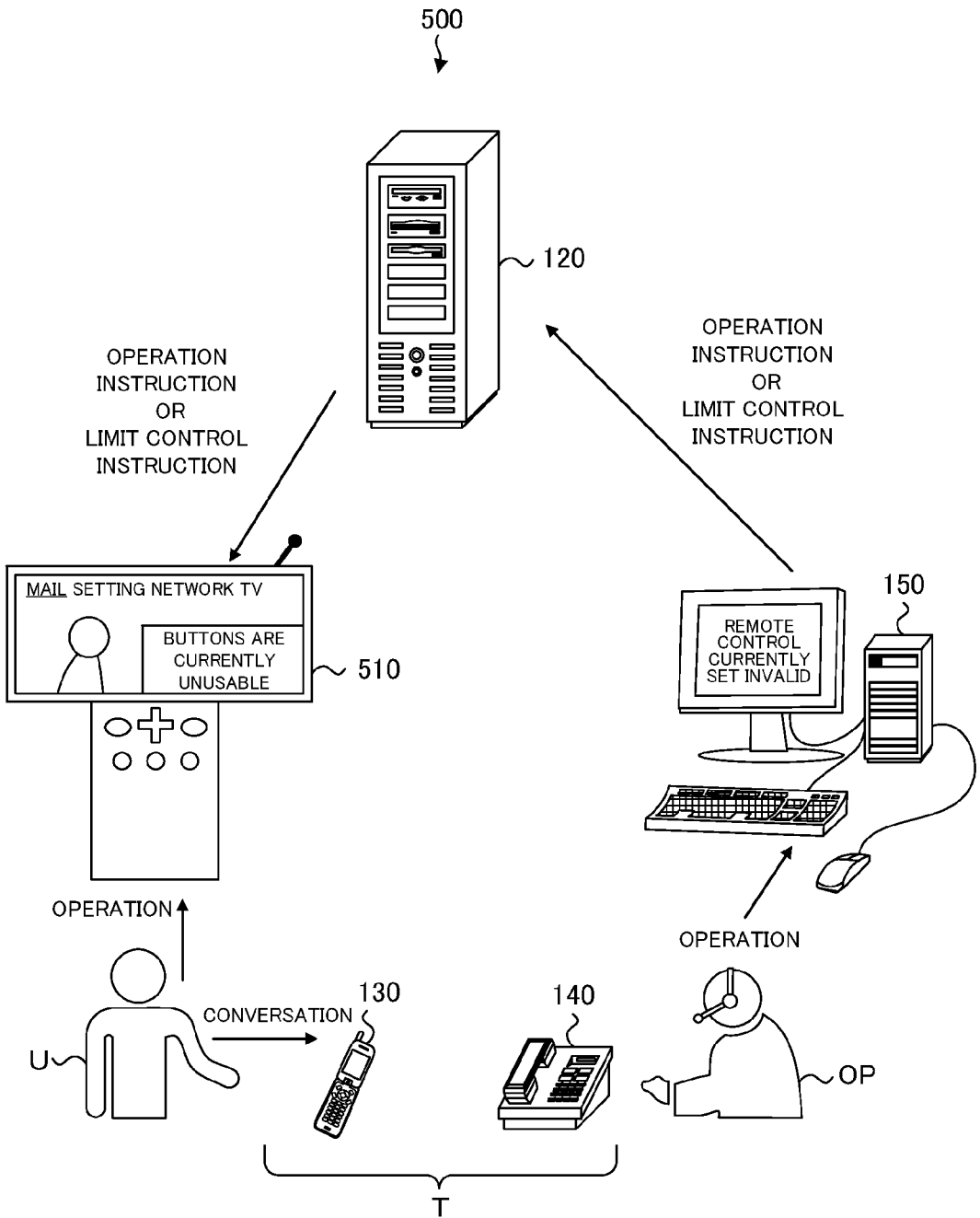
FIG. 18 is a conceptual diagram showing the configuration of an operation system for a mobile phone according to the invention.

In the above-described embodiment, an AV device is an object of operation from outside, and however the object may be a mobile terminal. FIG. 18 is a conceptual diagram showing the configuration of an operation system 500 for a mobile phone (mobile terminal). The operation system 500 for a mobile phone includes a mobile phone 510 and a server 120. The mobile phone 510, the server 120, and an external terminal 150 are connectable via a network. Regarding the mobile phone 510, the arrows shown in FIG. 15 represent transfer of main information. Incidentally, regarding transfer of information, only main information is represented in the figures below, and representation of other information will be omitted.

The mobile phone 510 is connectable to the server 120 via the network and operable via the network. The mobile phone 510 does not necessarily need to include a tuner for television, however, it has a capability of displaying a video image. Further, the mobile phone 510 functions as a terminal connected with the network. Also, the mobile phone does not necessarily need to have a conversation function, and may be a personal information terminal such as a PDA. The below description will be made, taking an example of a mobile phone. The network is an ordinary network, regardless of being wired or wireless.

Figure 19:
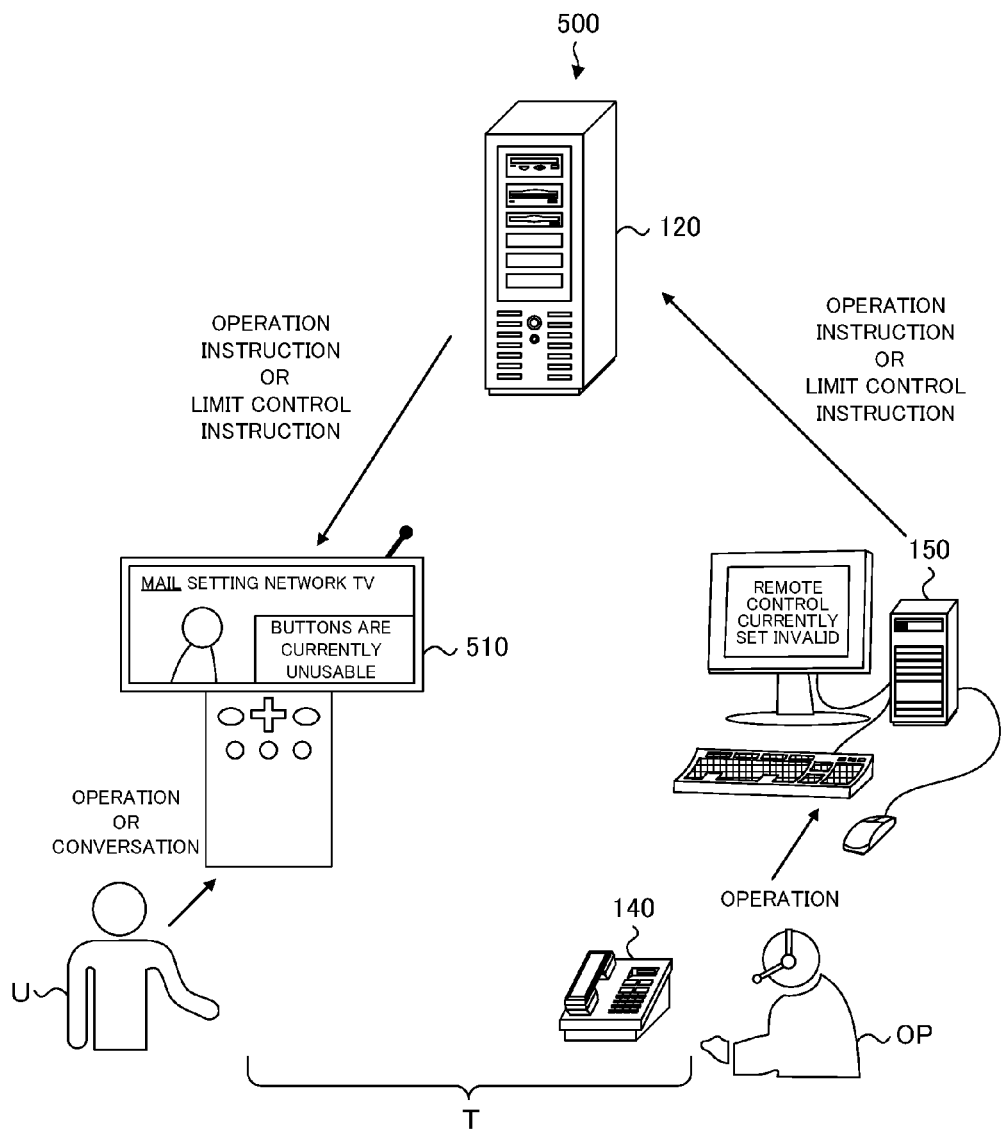
FIG. 19 is a conceptual diagram showing the configuration of an operation system for a mobile phone according to the invention.

FIG. 19 is a conceptual diagram showing the configuration of an operation system 500 for a mobile phone having a conversation function. The mobile phone 510 of a user U and a phone 140 of an operator OP constitute transfer means T. The user U talks with the operator OP, using the mobile phone 510. The operator OP operates the mobile phone 510 via the server 120, using the external terminal 150.

Figure 20A:
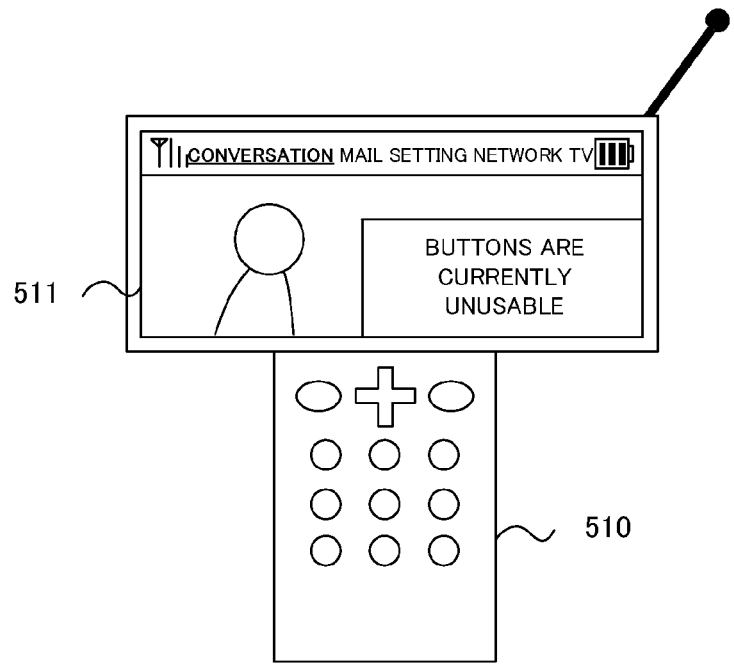
FIGS. 20A to 20C are diagrams showing an example of a display on the mobile phone.
Figure 20B:
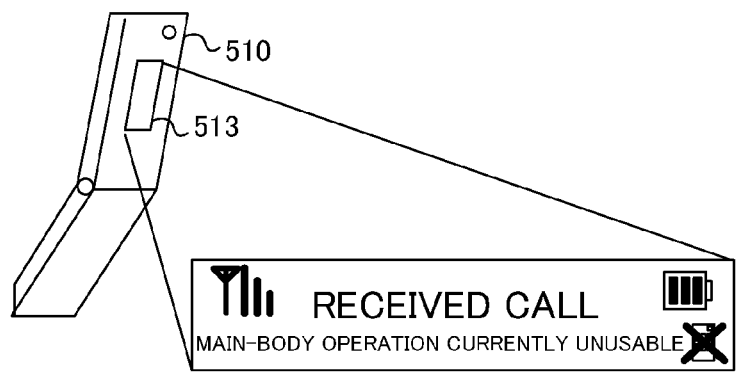
Figure 20C:
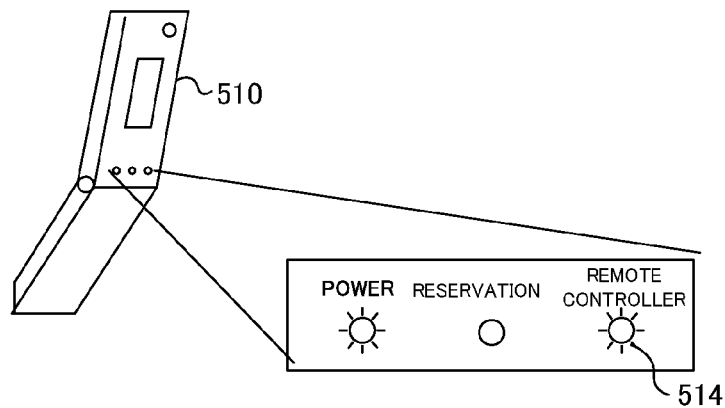

FIGS. 20A and 20B are diagrams showing an example of a display as to whether or not a remote control of the mobile phone 510 is usable. As shown in FIG. 20A, when the user operation invalid state is set, a display screen 511 displays a message meaning 'Buttons are currently unusable.' This display is generated such as to superimpose on an original image displayed by the mobile phone, and inform the state of operational limit to the user. Further, as shown in FIG. 20B, display may be generated with a sub display 513 as a mobile phone-side display section 512. The sub display 513 is fitted to the main body of the mobile phone 510 and displays information by characters and icons. Still further, as shown in FIG. 20C, a state indication lamp 514 may be fitted on the main body of the mobile phone 510 to indicate the valid or invalid state of user operation by the lighting state thereof or a color of lighting.

Figure 21:
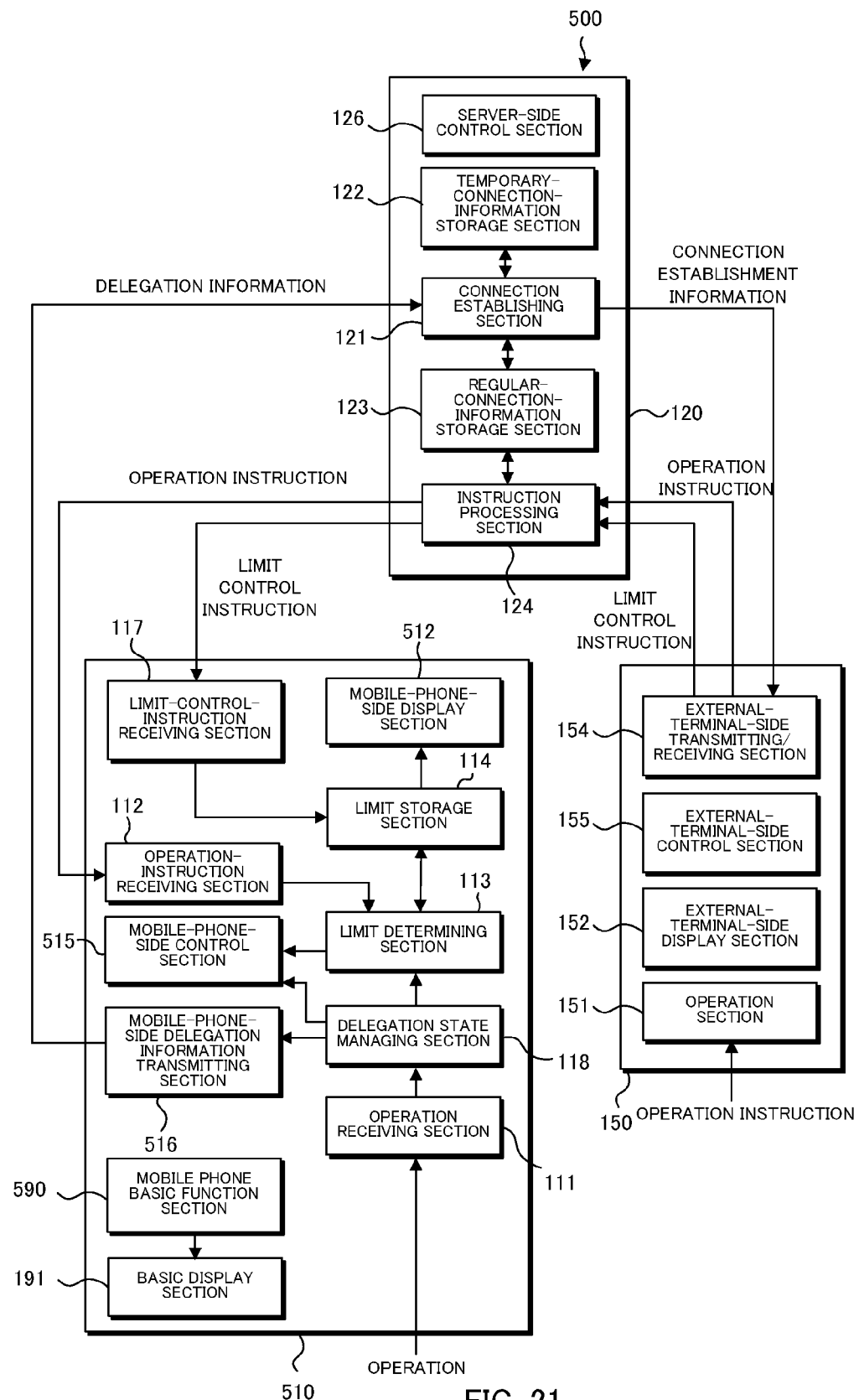
FIG. 21 is a block diagram showing the configurations of the respective parts of an operation system for a mobile phone according to the present invention.

FIG. 21 is a block diagram showing the configurations of the respective parts of an operation system 500 for a mobile phone. A mobile phone-side control section 515 and a mobile phone-side delegation information transmitting section 516 are respectively corresponding to a receiver-side control section 115 and a receiver-side delegation information transmitting section 116. The mobile phone-side control section 515 controls the respective sections of the mobile phone 510. When a limit determining section 113 has determined that an operation is not limited, the mobile phone-side control section 515 executes a control accompanying the operation. The mobile phone-side delegation information transmitting section 516 transmits delegation information managed by a delegation state managing section 118 to a server 120. Further, a mobile phone basic function section 590 has a video image reproduction function and the like as original functions of a mobile phone. A television broadcast signal receiving function and a television broadcast decoding function may be provided. A basic display section 191 displays a video image, which is an output from the mobile phone basic function section 590, a menu screen created by the mobile phone 510 itself, an electronic program list, a BML, a game screen, a mail screen, a browser, a wave receiving state, a battery remaining amount, or the like. In such a manner, most of the system is configured similarly to that in Embodiment 1.

However, a mobile phone-side display section 152 displays, as shown in FIG. 20. Further, the mobile phone basic function section 590 includes at least one general function as a mobile phone. General functions as those of a mobile phone include, for example, a communication function, a conversation function, a mailing function, a browser function, a still image processing function, a video image processing function, a power managing function, and a camera function. The basic display section 191 displays a content created by the mobile phone-side basic function section 590. In performing display, as shown in FIG. 17A, an image by the mobile phone-side display section 512 is displayed being superimposed on an image by the basic display section 191. The performances of the server 120 and the external terminal 150 are similar to those in Embodiments 1 and 2, and description will be omitted.

The invention claimed is:

1. An AV device operable via a network, comprising:
an operation receiver that receives an operation given via said network;
an operation receiver that receives an operation that is directly given without using the network;
a limit determiner that determines limits for the operation given via a network and the operation directly given without using the network, each operation limit being determined based on the substance of the operation and the origin of the operation so as to avoid conflict between the operation given via the network and the operation directly given without using the network, wherein there is no simultaneous limitation of operations with different origins;
a receiver-side controller that executes a control accompanying an operation when said limit determiner determines not to limit the operation; and
a basic display section that displays based on a basic function, wherein the AV device further displays corresponding to an operation given via the network, superimposing the operation display on the display by the basic display section.

2. The AV device according to claim 1, further comprising:
a delegation-state manager that manages whether or not an operation is delegated to an external terminal connected to the network,
wherein, the delegation-state manager makes the limit determiner determine whether or not to limit an operation received by the operation receiver when an operation is delegated to the external terminal,
the delegation-state manager does not make the limit determiner limit operations received by the operation receiver when an operation is not delegated to the external terminal.

3. The AV device according to claim 1, further comprising:
a limit-control-instruction receiver that receives a limit control instruction that instructs a control whether or not to limit each operation,
wherein, according to said received limit control instruction, said limit-control-instruction receiver decides a determination criterion for said limit determiner to determine whether or not to limit each operation.

4. The AV device according to claim 1, further comprising:
a limit storage that stores a limit determination table that associates an operation based on said received operation-instruction or said received operation, with an operational limit, wherein said limit determiner determines whether or not to limit each operation, based on said stored limit determination table.

5. The AV device according to claim 1, further comprising:
a receiver-side display section that displays a content of an operational limit, based on said determination criterion for said limit determiner to determine whether or not to limit each operation.

6. The AV device according to claim 5, further comprising:
a receiver-side image processor that processes an image displayed by said basic display section and an image displayed by said receiver-side display section to create shared image data as an image shared with outside; and
a receiver-side image transmitter/receiver that transmits said shared image data to said outside via a server.

7. The AV device according to claim 6,
wherein said receiver-side display section displays said shared image data, superimposing it on the display by said basic display section.

8. The AV device according to claim 6, wherein, when an operation that does not transmit the display by said basic display section has been made, said receiver-side image processor creates said shared image data in which the display by said basic display section is not displayed.

9. The AV device according to claim 1, wherein said AV device is a television receiver.

10. The AV device according to claim 1, wherein said AV device is an STB.

11. The AV device according to claim 1, wherein said AV device is a mobile terminal.

12. A server that enables operation of an AV device from an external terminal via a network, said server comprising:
a connection establisher that establishes a connection between said external terminal and said AV device by transmitting connection establishment information to the AV device upon receiving delegation information transmitted from said AV device for delegating an operation of said AV device from said external terminal; and
an instruction processor that receives an operation-instruction that is transmitted from said external terminal in order to operate said AV device, and transmit said operation-instruction to said AV device for which the connection with said external terminal is established, wherein responsive to receiving the connection establishment information, the AV device determines limits for the operation given via a network and the operation directly given without using the network, each operation limit being determined based on the substance of the operation and the origin of the operation so as to avoid conflict between the operation given via the network and the operation directly given without using the network, wherein there is no simultaneous limitation of operations with different origins.

13. An operation system for an AV device, comprising a group of an AV device, a server, and an external terminal connected via a network,
wherein said server includes:
an instruction processor that receives an operation-instruction that is transmitted from said external terminal in order to operate said AV device, and transmit said operation-instruction to said AV device for which a connection with said external terminal is established,
wherein said AV device includes:
an operation-instruction receiver that receives an operation-instruction given via said network;
an operation receiver that receives an operation that is directly given not via said network;
a limit determiner that determines limits for the operation given via a network and the operation directly given without using the network, each operation limit being determined based on the substance of the operation and the origin of the operation so as to avoid conflict between the operation given via the network and the operation directly given without using the network, wherein there is no simultaneous limitation of operations with different origins; and
a receiver-side controller that executes a control accompanying an operation when said limit determiner determines not to limit the operation.

14. A non-transitory computer readable medium storing an operation program for an AV device operable via a network which when executed by a processor causes the AV device to perform a method comprising:
receiving an operation given via said network;
receiving an operation that is directly given not via said network;
determining limits for the operation given via a network and the operation directly given without using the network, each operation limit being determined based on the substance of the operation and the origin of the operation so as to avoid conflict between the operation given via the network and the operation directly given without using the network, wherein there is no simultaneous limitation of operations with different origins;
executing a control accompanying an operation when it is determined not to limit the operation.

* * * * *